(12) United States Patent  
Ishida et al.

(10) Patent No.: US 9,722,443 B2  
(45) Date of Patent: Aug. 1, 2017

(54) POWER DISTRIBUTION DEVICE

(75) Inventors: Takaharu Ishida, Tokyo (JP); Kazumi Rissen, Tokyo (JP); Tohru Watanabe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 687 days.

(21) Appl. No.: 14/239,945

(22) PCT Filed: Sep. 16, 2011

(86) PCT No.: PCT/JP2011/005236  
§ 371 (c)(1),  
(2), (4) Date: Feb. 20, 2014

(87) PCT Pub. No.: WO2013/038458  
PCT Pub. Date: Mar. 21, 2013

(65) Prior Publication Data  
US 2014/0210267 A1   Jul. 31, 2014

(51) Int. Cl.  
*H02J 7/00* (2006.01)  
*H02J 7/34* (2006.01)  
(Continued)

(52) U.S. Cl.  
CPC ......... *H02J 7/0063* (2013.01); *H01M 10/441* (2013.01); *H01M 10/443* (2013.01); *H01M 10/482* (2013.01); *H01M 10/486* (2013.01); *H02J 3/32* (2013.01); *H02J 7/0021* (2013.01); *H02J 7/34* (2013.01); *H01M 2010/4271* (2013.01); *H02J 2007/0067* (2013.01); *Y10T 307/406* (2015.04)

(58) Field of Classification Search  
CPC ........ H02J 3/32; H02J 3/46; H02J 7/00; H02J 7/0021; H02J 7/007; H01M 10/48; H01M 10/441; H01M 10/482  
USPC .................... 307/31; 320/107, 126, 134, 136  
See application file for complete search history.

(56) References Cited

U.S. PATENT DOCUMENTS 5,600,566 A * 2/1997 Park .................. G01R 31/3624  
320/DIG. 21  
6,094,031 A * 7/2000 Shimane ............. B60L 11/1855  
320/118  
(Continued)

FOREIGN PATENT DOCUMENTS

JP   2002-044870 A   2/2002  
JP   2005-206085 A   8/2005  
(Continued)

*Primary Examiner* — Thienvu Tran  
*Assistant Examiner* — David M Stables  
(74) *Attorney, Agent, or Firm* — Volpe and Koenig, P.C.

(57) ABSTRACT

There is a request for charging and discharging of a lithium-ion battery with as less degradation as possible. In an operation using only binary values as in conventional technology, however, in a charged state in which the battery is used, there is a high possibility that the battery is used toward accelerating the degradation thereof. In a power distribution device for distributing power between a plurality of batteries and a plurality of customers, when distributing the power of the batteries to the loads of the customers, by being based at least on the degradation information of the batteries, the state of charge, and the temperature data of the batteries, a battery discharging function is achieved that makes the degradation of the batteries minimum.

11 Claims, 29 Drawing Sheets

(51) Int. Cl.
*H01M 10/44* (2006.01)
*H01M 10/48* (2006.01)
*H02J 3/32* (2006.01)
*H01M 10/42* (2006.01)

(56) References Cited

U.S. PATENT DOCUMENTS

| | | | | |
|---|---|---|---|---|
| 6,504,344 | B1* | 1/2003 | Adams | G01R 31/3658 320/132 |
| 6,891,353 | B2* | 5/2005 | Tsukamoto | H01M 10/44 320/136 |
| 2008/0028237 | A1* | 1/2008 | Knight | H04L 12/66 713/300 |
| 2008/0103709 | A1* | 5/2008 | Yun | H01M 10/486 702/63 |
| 2010/0001693 | A1* | 1/2010 | Iida | G01R 31/3679 320/134 |
| 2010/0029268 | A1* | 2/2010 | Myer | F21S 2/00 455/426.1 |
| 2011/0210747 | A1* | 9/2011 | Heo | G01R 31/3658 324/434 |
| 2012/0256569 | A1* | 10/2012 | Kawahara | H01M 10/486 318/139 |

FOREIGN PATENT DOCUMENTS

| | | |
|---|---|---|
| JP | 2007-259612 A | 10/2007 |
| JP | 2008-118790 A | 5/2008 |
| JP | 2009-183086 A | 8/2009 |
| JP | 2011-135727 A | 7/2011 |

\* cited by examiner

FIG. 7

| 141 | 142 | 143 | 144 | 145 | 146 | 147 |
|---|---|---|---|---|---|---|
| No. | BATTERY TEMPERATURE | DATE AND TIME | SOC | DEGREE OF DETERIORATION OF BATTERY | POSSIBLE CHARGING AND DISCHARGING ELECTRIC POWER | RATED CAPACITY |
| OOOO | OOOO | OO:OO | OOOO | OOOO | OOOO | OOOO |
| OOOO | OOOO | OO:OO | OOOO | OOOO | OOOO | OOOO |
| OOOO | OOOO | OO:OO | OOOO | OOOO | OOOO | OOOO |
| OOOO | OOOO | OO:OO | OOOO | OOOO | OOOO | OOOO |
| OOOO | OOOO | OO:OO | OOOO | OOOO | OOOO | OOOO |

| No. | DATE AND TIME | LOAD TYPE | REQUIRED ELECTRIC POWER | ORDER OF PRIORITY |
|---|---|---|---|---|
| ○○○○ | ○○:○○ | ○○○○ | ○○○○ | ○○○○ |
| ○○○○ | ○○:○○ | ○○○○ | ○○○○ | ○○○○ |
| ○○○○ | ○○:○○ | ○○○○ | ○○○○ | ○○○○ |
| ○○○○ | ○○:○○ | ○○○○ | ○○○○ | ○○○○ |
| ○○○○ | ○○:○○ | ○○○○ | ○○○○ | ○○○○ |
| ○○○○ | ○○:○○ | ○○○○ | ○○○○ | ○○○○ |

FIG. 11B

| | TYPE OF LOAD | EXAMPLE |
|---|---|---|
| LEVEL IS HIGH | LOAD FOR OPERATING DEVICES DIRECTLY AFFECTING LIFE MAINTENANCE | MEDICAL-RELATED |
| LEVEL IS MODERATE | LOAD FOR OPERATING DEVICES INDIRECTLY AFFECTING LIFE MAINTENANCE | INFRASTRUCTURE-RELATED |
| LEVEL IS LOW | LOAD AFFECTING LIFE MAINTENANCE NEITHER DIRECTLY NOR INDIRECTLY | CONSUMER ELECTRONICS-RELATED |

PRIORITIZATION ACCORDING TO TYPE OF CONNECTED LOAD

167

| | UNHURT | SLIGHTLY | MODERATELY | SEVERELY | FATALLY |
|---|---|---|---|---|---|
| VERY FREQUENTLY OCCURS | C | B3 | A1 | A2 | A3 |
| FREQUENTLY OCCURS | C | B2 | B3 | A1 | A2 |
| SOMETIMES OCCURS | C | B1 | B2 | B3 | A1 |
| UNLIKELY TO OCCUR | C | C | B1 | B2 | B3 |
| ALMOST UNLIKELY TO OCCUR | C | C | C | B1 | B2 |
| INCONCEIVABLE | C | C | C | C | C |

$$\begin{bmatrix} \dot{I}_G \\ \hline 0 \end{bmatrix} = \begin{bmatrix} \dot{Y}_{GG} & \dot{Y}_{GL} \\ \hline \dot{Y}_{LG} & \dot{Y}_{LL} \end{bmatrix} \begin{bmatrix} \dot{V}_G \\ \dot{V}_L \end{bmatrix} \quad \cdots (1)$$

$\dot{I}$ : BUS CURRENT $\dot{Y}$ : BUS ADMITTANCE MATRIX $\dot{V}$ : BUS VOLTAGE $$\dot{W}_i^k = \dot{V}_i \times \dot{I}_i^{k*} \quad \cdots (2)$$

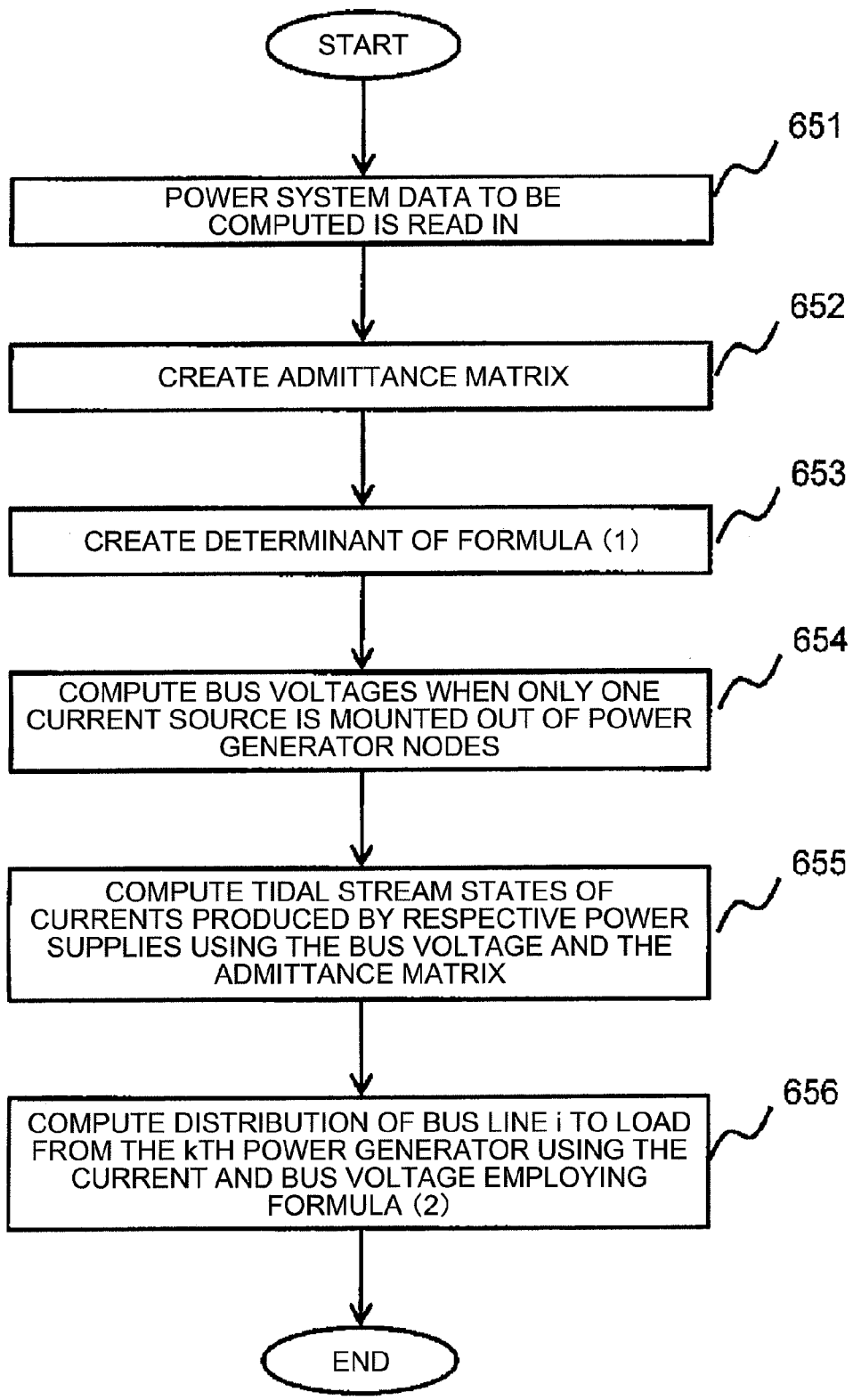

FIG. 16A

| FACILITY NAME | RESISTIVE COMPONENT | INDUCTIVE COMPONENT | CAPACITIVE COMPONENT | TAP RATIO |
|---|---|---|---|---|
| #1 - #2 | | | | |
| #2 - #3 | | | | |
| #3 - #4 | | | | |
| #4 - #5 | | | | |

| FACILITY NAME | WHETHER THERE IS POWER GENERATOR | SPECIFIED VOLTAGE VALUE | INITIAL VOLTAGE VALUE | PG | QG | PL | QL | SCShR |
|---|---|---|---|---|---|---|---|---|
| #1 | | | | | | | | |
| #2 | | | | | | | | |
| #3 | | | | | | | | |
| #4 | | | | | | | | |

FIG. 16C

| CUSTOMER NAME \ STORAGE BATTERY NAME | #1 | #2 | #N |
|---|---|---|---|
| #1 | | | |
| #2 | | | |
| #3 | | | |
| #4 | | | |

| CUSTOMER NAME | AMOUNT OF ELECTRICITY BOUGHT (kWh) | UNIT PRICE OF ELECTRICITY BOUGHT (¥) | AMOUNT OF ELECTRICITY SOLD (kWh) | UNIT PRICE OF ELECTRICITY SOLD (¥) | AMOUNT OF MONEY FOR SETTLEMENT (¥) | TRANSACTION PERIOD |
|---|---|---|---|---|---|---|
| #1 | | | | | | |
| #2 | | | | | | |
| #3 | | | | | | |
| #4 | | | | | | |

702 http://www.toshiba.co.jp/tech/review/1999/05/b02/fb02z8_j.htm

POWER DISTRIBUTION DEVICE

TECHNICAL FIELD

The present invention relates to a technique for recovering electric power from a total blackout using storage batteries and also to a technique regarding load leveling using storage batteries.

BACKGROUND ART

JP-A-2009-183086 (patent literature 1) exists as a background technique for the present technical field. In this publication, there is disclosed a technique regarding a power supply system which provides an overall management of the ownership of a plurality of storage batteries when electric power is supplied from a PHEV or the like to an electric power system while eliminating any arbitrary decision of the owner of the storage batteries such that electric power is supplied stably, thus securing reliability. In this publication, there is disclosed a technique which, when electric discharging is done from a plurality of storage batteries (storage batteries installed in an electric vehicle) to an electric power system, stabilizes the supplied electric power by identifying the storage batteries installed in the electric vehicle according to excess or deficiency of electric power and giving an instruction to stop the supply of electric power to the electric power system by means of electric power matching means.

CITATION LIST

Patent Literature

Patent literature 1: JP-A-2009-183086

SUMMARY OF INVENTION

Technical Problem

However, the technique of patent reference 1 assumes a condition where there are only two values, i.e., whether identified storage batteries are used or not. To provide control using such two values is to use 100% discharging and 0% discharging (no discharging). Such extreme discharging control will lead to degradation of batteries such as lithium ion batteries.

Solution to Problem

The present application includes a plurality of means that solves the above-described problem. One example thereof solves the foregoing problem by adjusting the amount of electric power released according to the amount of electric power stored in storage batteries.

Advantageous Effects of Invention

The use of the invention of the present application allows for supply of electric power from storage batteries to a system while suppressing degradation of the storage batteries.

BRIEF DESCRIPTION OF DRAWINGS

FIG. 7 is one example of data obtained from storage batteries.
FIG. 11A is one example of risk matrix.
FIG. 11B is one example of table showing orders of priority of loads.
FIG. 15 is one example of flowchart for calculation of a green power index.
FIG. 16A is one example of input data and output data for calculation of a green power index,
FIG. 16B is one example of input data and output data for calculation of a green power index.
FIG. 16C is one example of input data and output data for calculation of a green power index.
FIG. 17 is one example of data needed when electric power is bought and sold by a customer.

DESCRIPTION OF EMBODIMENTS

Embodiments are hereinafter described with reference to the drawings.

Embodiment 1

Figure 1:
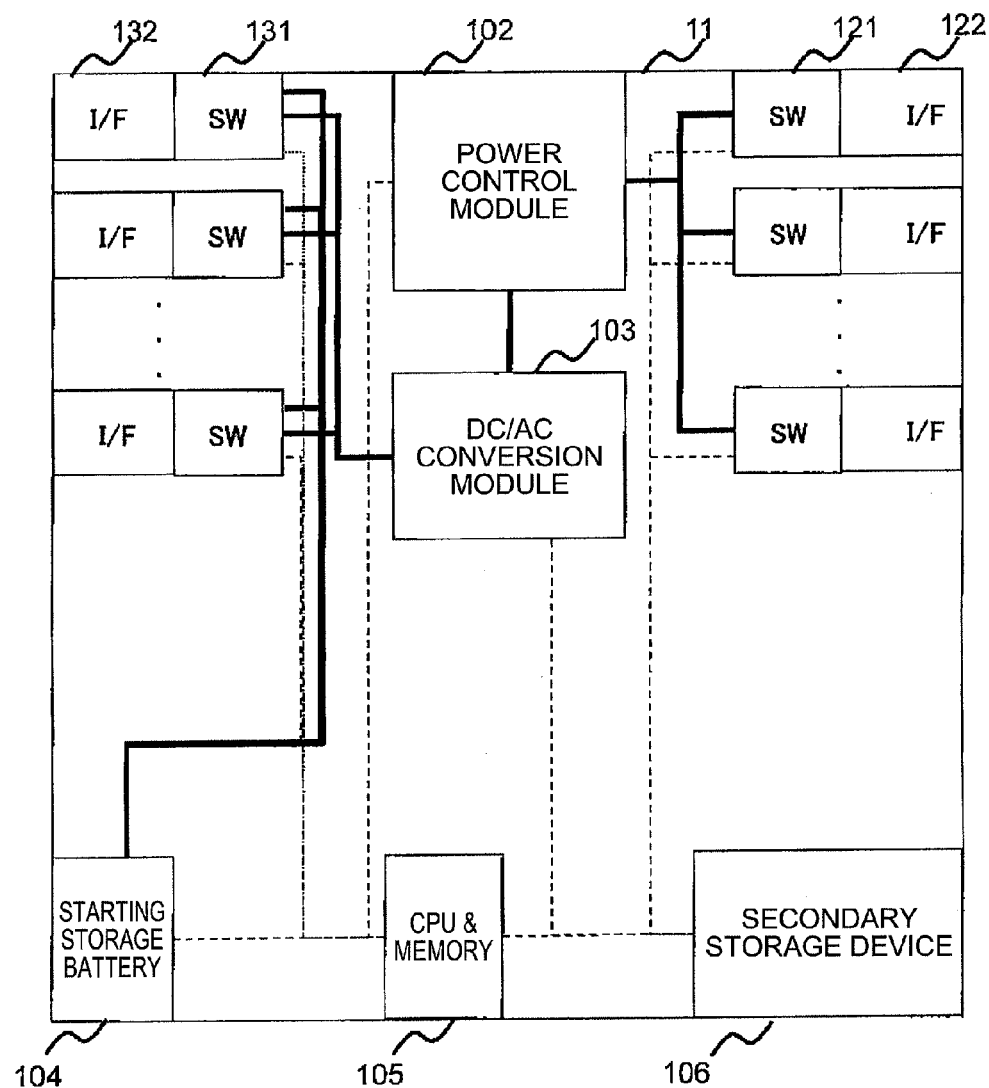
FIG. 1 is a first embodiment of power distribution device.

FIG. 1 is a first configuration for achieving a power distribution device of the present invention. In the first embodiment, a system configuration has a plurality of devices equipped with storage batteries and a plurality of consumers of electricity which are connected with the power distribution device. The system configuration controls the outputs of the storage batteries in real time following the demand from the consumers that varies from moment to moment so as to minimize deterioration of the batteries. The power distribution device, 11, of the present embodiment is composed of I/Fs 132 for connection with the storage batteries, switches 131 mounted between the I/Fs and the modules of the power distribution device when the storage batteries are connected, a power control module 102 for efficiently distributing electric power discharged from the storage batteries to the load side, a DC/AC conversion module 103 which, when the electric power delivered from the storage batteries are a DC power, converts it into an AC power used as a general load, a starting storage battery 104 for starting up the power distribution device even in the event of a total blackout, a CPU & memory 105 for driving the power distribution device, a secondary storage device 106 in which a program and a database for driving the power distribution device are stored, I/Fs 122 for connection with equipment on the load side, and switches 121 disposed between the I/F of the equipment on the load side and modules within the power distribution device. The secondary storage device 106, CPU & memory 105, starting storage battery 104, power control module 102, DC/AC conversion module 103, storage battery side switches 131, and the customer side switches 121 are connected by communication lines.

Figure 2:
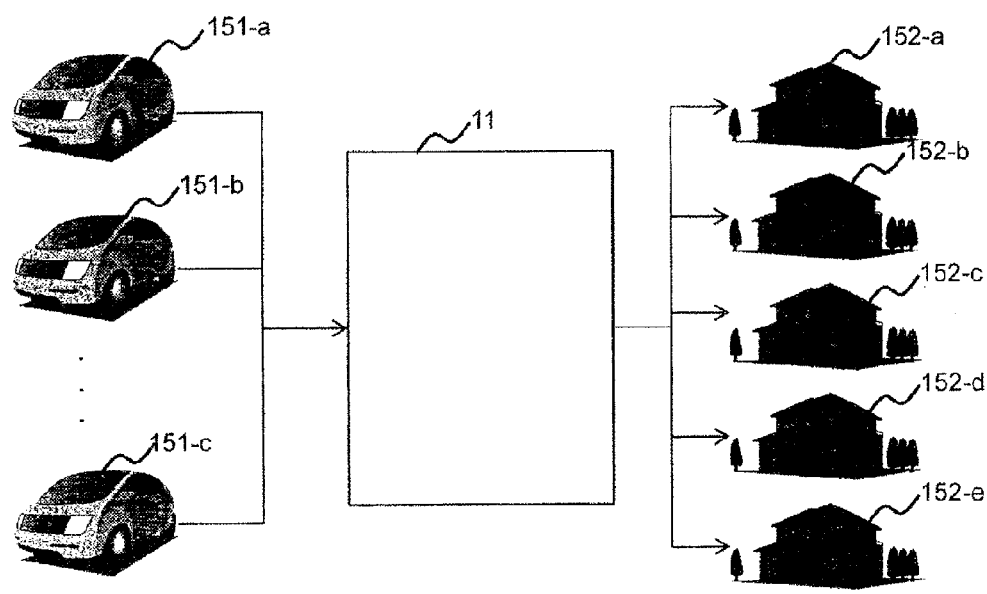
FIG. 2 is one example employing the first embodiment of power distribution device.

FIG. 2 shows an example in which storage batteries and customers are connected using the power distribution device. In the present embodiment, movable electric vehicles and plug-in hybrid vehicles are exemplified as storage batteries. Of course, stationary storage batteries may be used. Any one of the storage battery side I/Fs 132 of the power distribution device and any one of storage batteries 151-*a* to 151-*c* are connected by a cable. On the other hand, any one of customer side I/Fs 122 and any one of customers 152-*a* to 152-*e* are connected. Here, they can be connected in any arbitrary order on the storage battery side and on the customer side.

Figure 3:
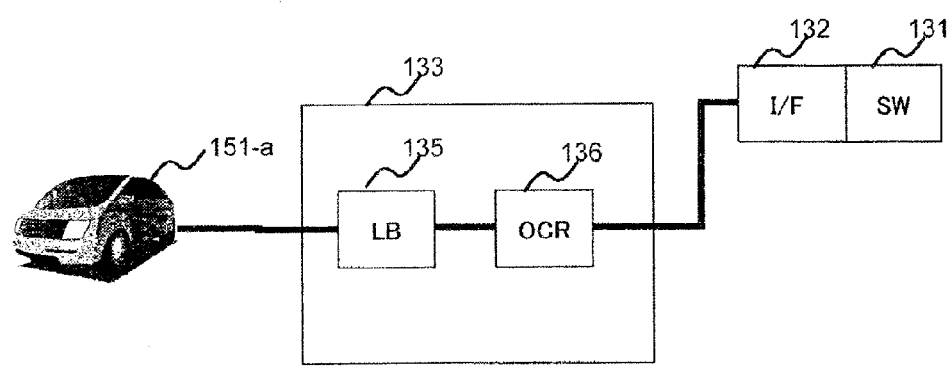
FIG. 3 is one example of connection configuration on the storage battery side in the power distribution device.

As shown in FIG. 3, in a case where the storage batteries are an electric vehicle, there may be a control box 133 having an earth leakage breaker 135 and an overcurrent interrupting breaker 136 between the storage batteries 151-*a* to 151-*c* and the storage battery side I/Fs 132 of the power distribution device 11.

Figure 4:
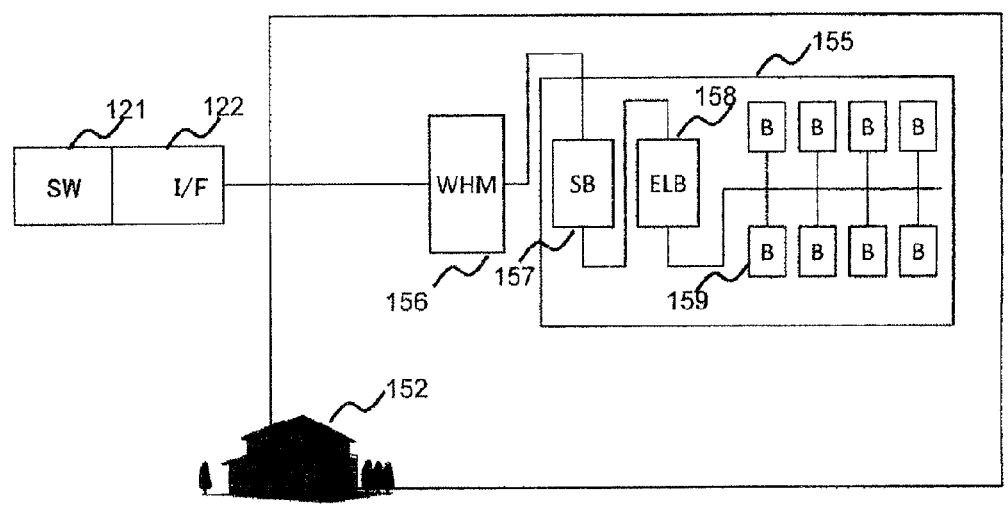
FIG. 4 is one example of facility configuration on the customer's side in the power distribution device.

As shown in FIG. 4, the customers 152 connect the customer side I/Fs 122 with customer side watt-hour meters 156 using cables in order to connect the power distribution device and the customers. In the present example, a distribution board 155 is mounted behind the watt-hour meters 156 (on the rear side as viewed from the system) and incorporates a contracted power circuit breaker 157, an earth leakage breaker 158, and secondary switches 159. Loads are connected to the subsequent stage of the secondary switches 159 and normally consume electric power.

Figure 5:
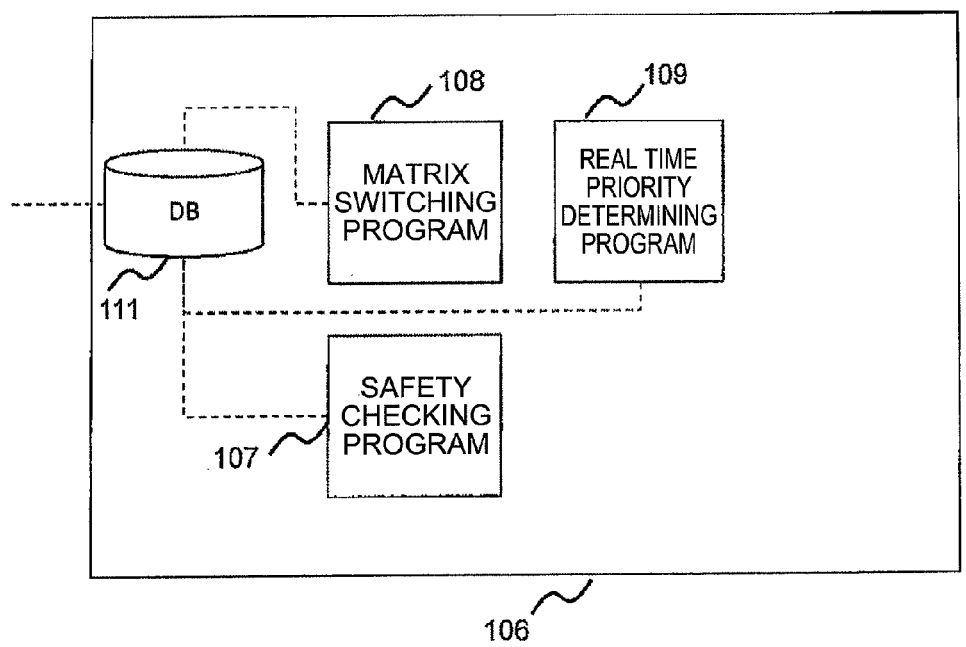
FIG. 5 is one example of the configuration of a secondary storage device.

Details of the secondary storage device 106 in FIG. 1 are described by referring to FIG. 5. The secondary storage device 106 has a database 111, a matrix switching program 108, a real time priority determining program 109, a safety checking program 107, and a charge calculating program 115. As described later, information obtained from the storage batteries, information intrinsic to the storage batteries, or the like is stored in the database 111. For a matrix switching function, a combination of storage batteries is achieved to minimize deterioration of the batteries when the storage batteries are discharged using real-time information from the storage batteries. The real time priority determining program 109 determines the priorities of distribution to the customers depending on the types of loads of the customers.

The operation of the power distribution device in the present embodiment is next described. In the power distribution device, the safety checking program 107 first makes a decision as to whether the connection of the storage batteries and the connection with the customers are made correctly.

Figure 6:
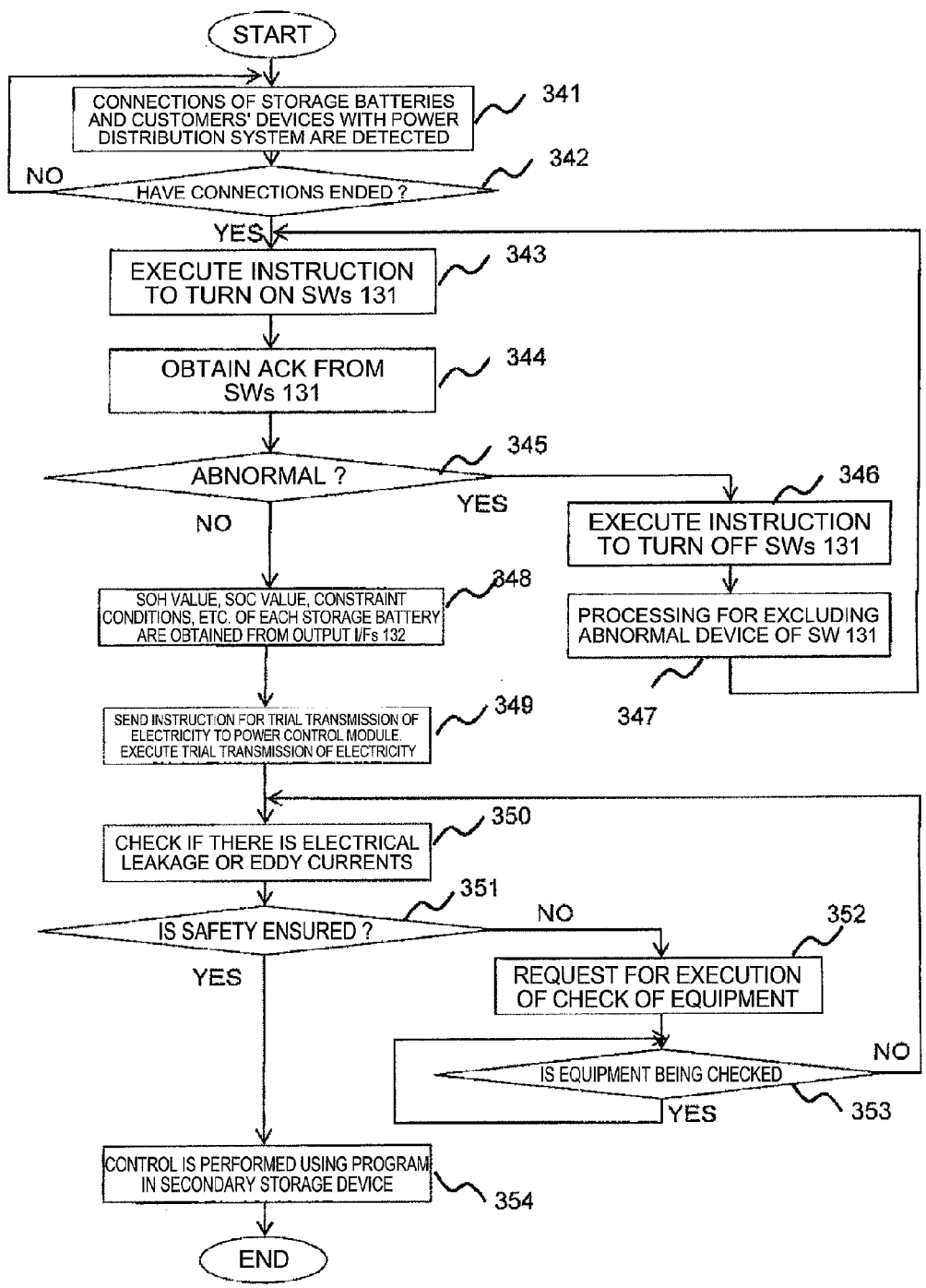
FIG. 6 is one example of flowchart of a safety checking program in the secondary storage device.

A procedure for making a decision as to whether the connection of the storage batteries and the connection with the customers are made correctly is described by referring to the flowchart of FIG. 6. First, at processing 341, detection is made if the storage batteries and customers have been connected with the power distribution device. At processing 342, a check is made if all the connections have ended. For this purpose, various methods can be employed. An available typical detection method consists of using information already recorded in a memory, the information indicating predetermined storage batteries and customers to be connected. Another detection method is that the connecting I/Fs of the power distribution device are all in operation. If connections have not ended, control waits until storage batteries and customers to be connected at 341 become connected with the power distribution device 11. If connections have ended, control proceeds to the next processing. If storage batteries or customers not connected at the beginning are added, control copes with the situation within the processing of a matrix switching program (described later). After the aforementioned connections of the storage batteries and customers have ended, at processing 343, the switches 131 on the storage battery side are turned ON. Then, at processing 344, an ACK signal indicating whether these switches have been turned ON is obtained. If ACK indicating that the switches have been correctly turned ON is returned from the switches 131 at processing 345, control goes to a later stage of processing 348. If an ACK signal from the switches is not correctly returned, at processing 346, an instruction for disconnecting the switches 131 is issued. At processing 347, processing for disconnecting devices connected with the downstream side of the abnormal switch 131 is performed. If the decision at processing 345 is that there is no abnormality, data indicating the SOH (State Of Health) value of each storage battery, SOC (State of Charge) value, and upper and lower limits of constraints on each storage battery (maximum and minimum amounts of charging electric power) is obtained from the output I/Fs 132 (processing 348). A value delivered from a controller (not shown) for the storage batteries is used as the SOH value. If any value is not directly output from the controller for the storage batteries, the value may be found in a simplified manner from the capacity of the storage batteries and from the amount of electric power under a full charge condition. Furthermore, regarding the SOC value, a value output from the controller for the storage batteries is used similarly. After obtaining data, at processing 349, an instruction for trial power transmission is sent from the CPU to the power control module 102, and a trial power transmission is carried out. Here, the trial power transmission is effected by turning the switches 121 from OFF state to ON state under an instruction from the CPU. During the trial power transmission, passing current values and voltage values directed for the customers are measured by a sensor attached to the switches 121. The values are stored in the database 111 in the secondary storage device 106 via communication lines. After the end of the trial power transmission, a decision is made as to whether electrical leakage and eddy currents are produced, using values measured by the aforementioned sensor as well as the earth leakage breaker 135 and overcurrent breaker 136 within FIG. 3. If it is determined at processing 351 using these values that neither electrical leakage nor eddy current occurs and if safety is ensured, the program within the secondary storage device 106 is executed at processing 354, thus providing control of supply and demand of the electric power. If no safety is ensured at processing 354, it is required at processing 352 that the equipment be inspected on the storage battery side and on the customer side. At processing 353, a decision is made as to whether the state in which the equipment is being inspected is in progress. When the equipment inspection ends, control returns to processing 350 and subsequent processing is continued.

One example of a database obtained from the storage batteries is shown at 140 in FIG. 7. In the illustrated example, the data obtained from the storage batteries consists of an identification number 141 of each storage battery, the battery temperature 142 of each storage battery, date and time 143 at which the data was derived, SOC 144 indicating the amount of charging power, degree of deterioration 145 of the battery indicative of SOH, possible charging and discharging electric power 146 indicative of a maximum electric power capable of being stored in the storage battery, and a rated capacity 147. These data are output from the controller for the storage batteries as described previously. Among these values, the battery degree of deterioration 145 can be found from the possible charging and discharging electric power 146 and rated capacity 147. Furthermore, physical indices regarding the batteries other than indicated in the database 140 can also be stored in the database.

Figure 8:
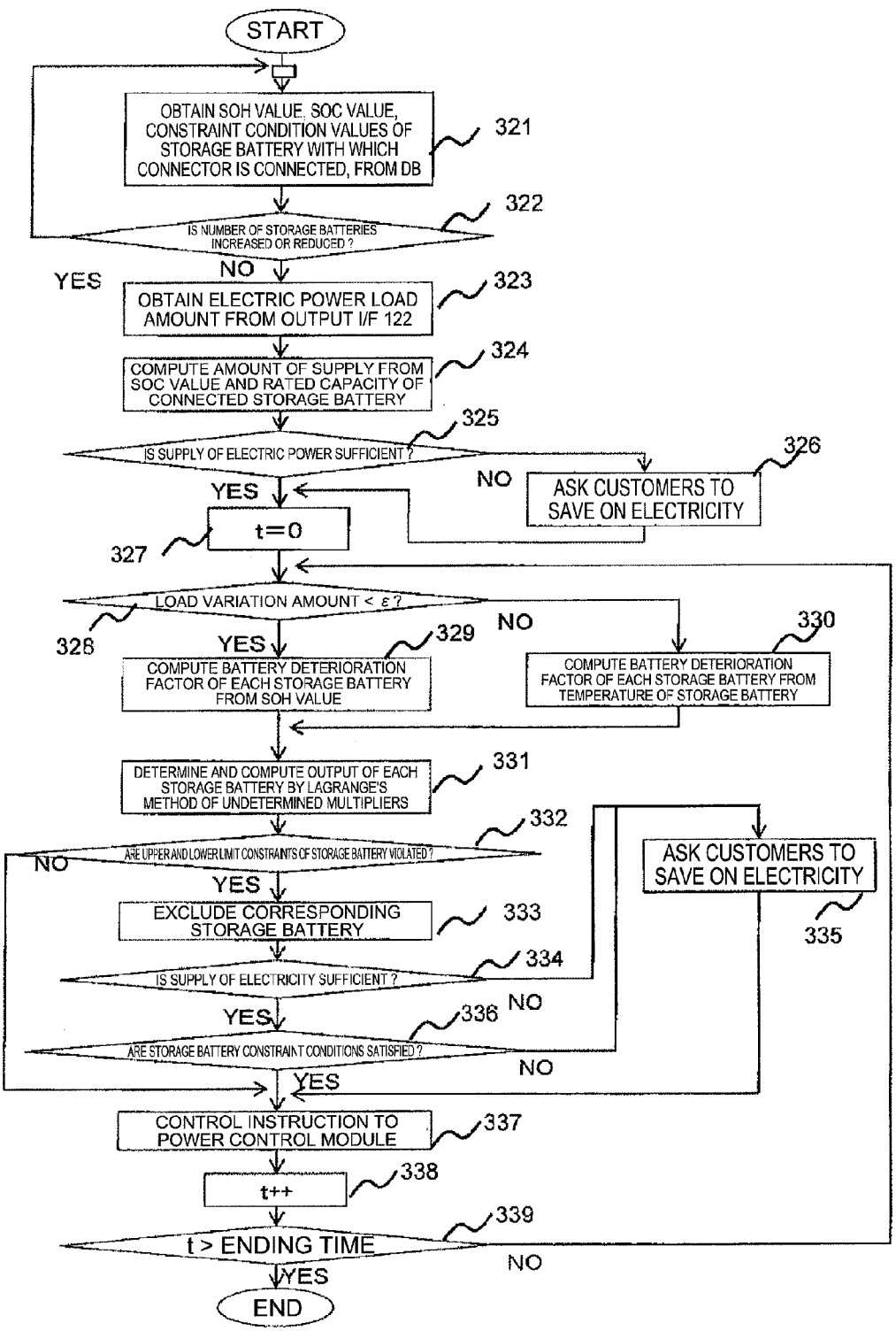
FIG. 8 is one example of processing of a matrix switching program in the secondary storage device.

A characteristic matrix switching function in the present embodiment is described by referring to the flowchart of FIG. 8. When storage batteries and customers are connected with a configuration as shown in FIG. 2, control of the storage battery outputs suffers from the problem that they must follow rapid load variations on the customer side due to recent spread of various kinds of domestic electrical appliances as described in the "Solution to Problem".

Figure 9:
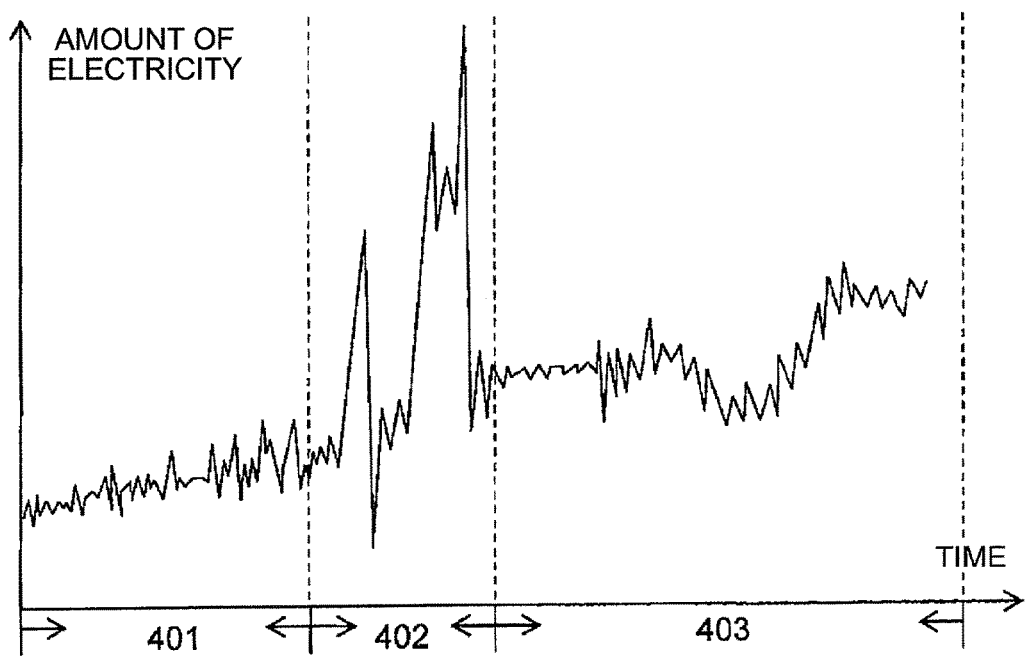
FIG. 9 is one example of demand variation.

Before describing the present processing, rapid load variations on the customer side are first described. In the graph within FIG. 9, the horizontal axis indicates elapsed time while the vertical axis indicates the amount of load on a customer. Within intervals 401 and 403 in the figure, the load increases mildly together with minute variations and, therefore, control presents no great problems. However, when great load variations occur as in an interval 402, the battery output needs to quickly follow the variations. In this case, it is technically important what output is required from what battery in real time and whether an output is provided in practice. Especially, in the case where the supplier power supply is a battery, if the cost of the battery is considered, it is desired to charge and discharge the battery such that deterioration progresses minimally. Especially, when a lithium ion battery is preserved at full charge, it deteriorates severely as generally said. Furthermore, as the battery is charged and discharged at higher temperature, the battery tends to deteriorate more quickly. Accordingly, in order to suppress deterioration, it is necessary to minimize the time for which the battery is at full charge and to charge and discharge the battery at somewhat low level of temperature. The battery needs to be charged and discharged while taking account of such deterioration elements. Based on this way of thinking, the operation of matrix switching program 108 (one example of processing of computation for distribution of battery outputs) enabling a selection or a combination of storage batteries which reduces deterioration of the storage battery side even if there is a rapid demand for electric power from the load side is described by referring back to FIG. 8.

First, at processing 321, data about the values of SOH, SOC value, constraint conditions, and so on shown in the database 140 and regarding the storage batteries with which the connector is connected are obtained from the database 111. Then, at processing 322, a check is made as to whether the number of storage batteries increases or decreases with the passage of time as compared with one earlier time point of computation. If the number of storage batteries connected with the power distribution device 11 does not vary, at processing 323, an amount of electric power demanded is obtained from a connected customer through the output I/F 122 on the customer side of the switches 121. If there is an increase or decrease in the number of storage batteries, updated data is again read in by processing 321 and then processing 323 is performed. Then, at step 324, a maximum amount of supply is calculated based on the SOC values and rated capacities of the connected storage batteries already obtained from the database 111. Based on these values, at processing 325, a check is made whether supply and demand is balanced between the storage batteries connected with the power distribution device and the loads from customers. If the decision at processing 325 is that there is no shortage, the time is reset at processing 327 and control goes to processing 328. If the decision at processing 325 is that the supply and demand relationship of the electric power is tight, the connected customers are asked to save on electricity at processing 326. After a power saving requirement is made, control proceeds to processing 327. Then, at processing 328, a check is made as to whether there is a great change in the amount of demand variation. $\epsilon$ which is a parameter indicative of a great variation in the demand and which appears at processing 328 is determined prior to activation of the power distribution device. When the amount of variation is equal to or less than $\epsilon$, i.e., there is no rapid load variation, the deterioration factor of each storage battery is computed based on the SOH value of each storage battery at processing 329. A parameter for determining the output is calculated based on deterioration of batteries encountered in normal use. The deterioration factor of storage batteries referred to herein is a parameter used in an economical load dispatching method that generally determines the outputs of plural power generators while likening storage batteries shown later to power generators. It is set using a function that reduces the output of a storage battery with increasing the parameter value. If the decision at processing 328 is that the amount of variation in demand is greater than $\epsilon$ and thus there is a rapid variation, data 140 about the temperatures of the storage batteries are obtained from the previously stored database 111. The battery deterioration factors of the batteries are computed from the temperatures of the storage batteries in order to select storage batteries which are at low temperatures and have relatively large capacities of electricity, thus reducing deterioration of the storage batteries. The battery deterioration factor referred to herein is also a parameter used to determine the amount of discharge from each storage battery by a generally stated economical load dispatching method while likening the storage batteries to power generators as described previously. This is set using a function that lowers the output of each storage battery with increasing the battery temperature. Based on the parameter varied whether the demand variation is large or small, computations of the outputs from batteries are carried out at processing 331 using a Lagrange's method of undetermined multipliers while regarding the problem as a problem equivalent to an economical load dispatching of power generators. An example of computations of the outputs from storage batteries using a Lagrange's method of undetermined multipliers in the present embodiment is given below. Here, each storage battery is regarded as a power generator. A method of economical load dispatching is applied while taking the degree of deterioration of each storage battery and the temperatures of the storage batteries as parameters as described previously. The purpose of using this method is to determine the outputs so as to minimize the whole deterioration of the storage batteries while maintaining the supply and demand balance.

Let PL be the total load required by customers. Let P1, P2, PN be the outputs from storage batteries. The demand and supply balance is given by
[mathematical formula 1]

$$P_1+P_2+\ldots P_N \text{ (where N is the number of storage batteries)} \quad \text{[mathematical formula 1]}$$

Therefore, letting F be the degree of deterioration (deterioration factor) of each storage battery, the total battery deterioration factor f is given by
[mathematical formula 2]

$$f=F_1(P_1)+F_2(P_2)+\ldots+F_N(P_N) \quad \text{[mathematical formula 2]}$$

Figure 10:
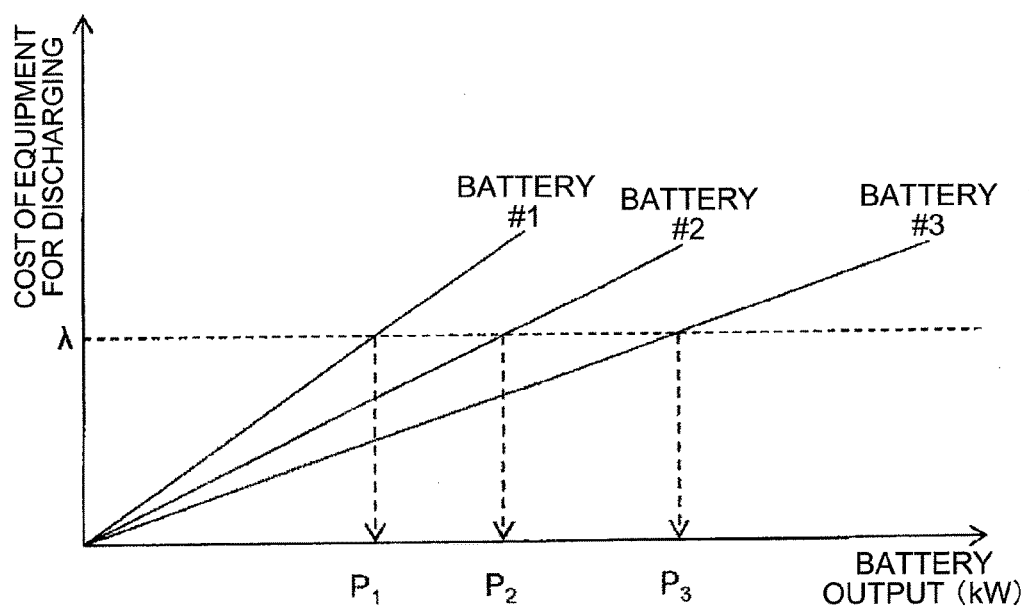
FIG. 10 is one example of explanatory diagram of a Lagrange's method of undetermined multipliers.

The problem is to find the outputs of storage batteries minimizing f. If this is solved by a Lagrange's method of undetermined multipliers, an optimum storage battery output distribution is determined by the following equation (FIG. 10).

[mathematical formula 3]

$$\lambda = \frac{dF_1}{dP_1} = \frac{dF_2}{dP_2} = \ldots = \frac{dF_N}{dP_N} \quad \text{[mathematical formula 3]}$$

After calculating the amounts of outputs from the storage batteries as described previously, the results of computations are stored in the database 111 at processing 331. A notice that the database has been updated is given to the power controlling function 102. Preparations are made to control the output values of storage batteries using the computed values. A decision is made at processing 332 as to whether a constraint condition, e.g., the capacity of the connected cable is not exceeded or discharging is done beyond the performance of each storage battery, is satisfied. That is, a decision is made at processing 332 as to whether constraint conditions not included in the constraint conditions of the Lagrange's method of undetermined multipliers used at processing 331 are satisfied. If a violation of the constraint conditions is found, the corresponding storage batteries are excluded at processing 333. A check is made at processing 334 as to whether the supply of electric power is sufficient for the demand. Then, control returns to processing 328, where the distribution of the outputs from the storage batteries is computed. If there is no violation of the constraint conditions, a decision is made at processing 336 as to whether the constraints of the upper and lower limits of the storage batteries are satisfied. If satisfied, the SWes 131 from the storage batteries and SWes 121 to customers' devices are controlled at processing 337. Actual electric power control is performed through control of the power control module 102. When DC/AC conversion is needed at this time, a signal for electric power conversion is output to the DC/AC converting function 103 such that the signal is converted into a desired electric power form. When the SWes 121 to customers' devices are controlled and when electric power is recovered, for example, from a total blackout using the power distribution device shown in the present embodiment, if a load such as medical devices to which electric power needs to be transmitted preferentially is included in the customers' devices, then it is necessary to supply electric power to such a kind of loads preferentially and in real time. Such a decision is carried out by a real time priority setting function. With the real time priority setting function 108, when customers' loads are connected via the SWes 121 and I/Fs 122, information indicating what kind of customers' devices are connected is stored in the database 111 using a communication means such as PLC (Power Line Communication). One example of the database is shown in FIGS. 11A and 11B. In FIG. 11A (data 160), data corresponding to number 161 given to a connected load, date and time 162 at which there was a request for power transmission from the load, the type of the load 163, and a requested amount of electric power 164 is sent from the load side. Depending on the type of the load, an order of priority 165 is set using the function of the database 111.

Figures 12, 13:
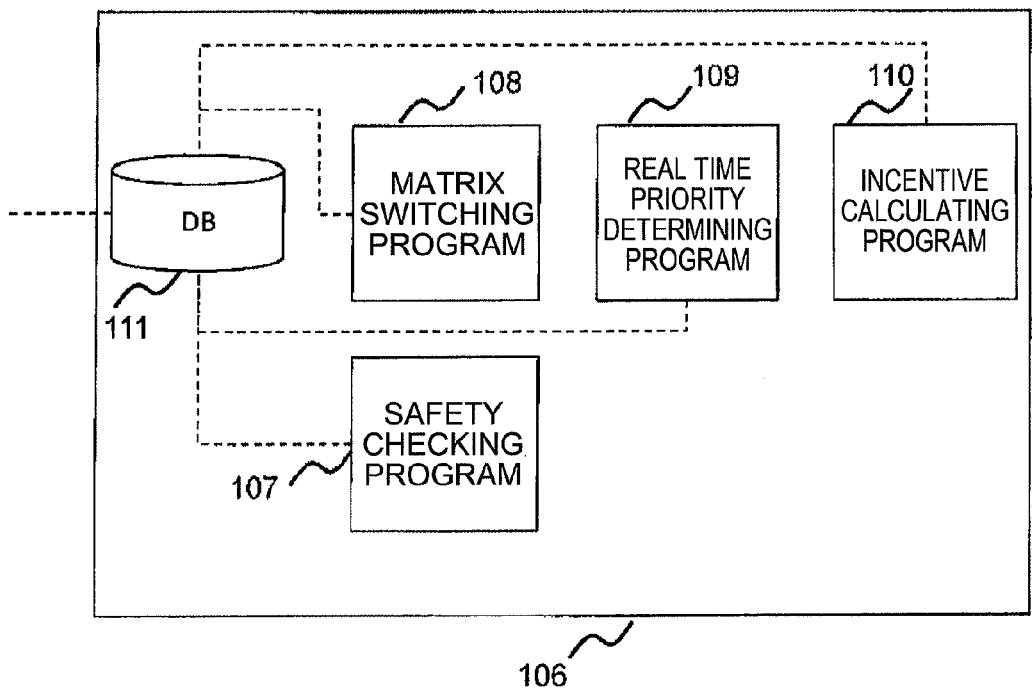
FIG. 12 is one example of risk matrix.
FIG. 13 is one example of configuration of a secondary storage device.

Examples of orders of priority are shown in FIG. 11B (data 166). In the present embodiment, an example is given in which orders of priority are previously classified into three stages: high, middle, and low stages. In the example 166, some definitions are established. As a load of a high priority order, a medical-related load is connected, and a load activating a device that directly affects the life support is connected. As a load of a moderate priority order, a load (e.g., a load associated with communications) is connected which sustains the infrastructure operated with electric power and which activates a device that indirectly affects the life support. As a load of a low priority order, a load that affects the life support with low possibility directly or indirectly such as demand from an electric light is connected. One example of method of setting these priority orders is a classification shown at 166. Besides, a risk map can be created as shown in FIG. 12. For example, inverter loads are connected, depending on the types of the connected loads. The frequency at which an instantaneous outage occurs is plotted on the vertical axis. The degree to which life is endangered concomitantly is plotted on the horizontal axis. A label sets forth a level at an intersection in the map. Based on such labels, priority orders can be given. Loads are controlled based on the priorities by issuing a control signal from a communication module and providing intermittent or continuous control of the SWes 121 on the customer side based on the signal.

As shown thus far, a system shown in the first embodiment of the present invention and operating to distribute electric power by connecting customers' devices and storage batteries has the power control module, DC/AC conversion module, starting storage battery, CPU & memory, secondary storage device having the matrix switching function, real time priority selecting program, and database, I/Fs and switches for connected devices. If large variations occur in the loads on the connected customers' devices, a discharging pattern for the storage batteries is computed so as to minimize deterioration of the performance of the storage batteries by varying the control according to the variations. Electric power can be supplied safely and stably according to the priorities of customers' devices. Furthermore, safe electric power, which prevents storage batteries from causing electrical leakage or eddy currents if electrical power from a system is not supplied, can be supplied stably to the connected customers' devices.

Embodiment 2

In the first embodiment of the present invention, supply of electric power within a geographical region is accomplished by causing the owners of storage batteries to offer the storage batteries when the electric power from a system is lost due to a disaster or the like and providing control at that time such that deterioration of the storage batteries is reduced to a minimum. In the present embodiment, storage batteries are discharged in such a way that deterioration of the storage batteries is suppressed to a minimum. In addition, this embodiment of the power distribution device is designed such that incentives offered to the owners of the storage batteries are taken into consideration. For example, the owners of the storage batteries may experience financial benefits or electric power discharged from the storage batteries is known as green power, i.e., containing a minimum amount of electric power derived from fossil fuels. To achieve such incentives, in this embodiment, the secondary storage device 106 is configured as shown in FIG. 13. In the present embodiment, an incentive calculating program 110 exists in the secondary storage device 106 shown in FIG. 5. The program reads in data stored in the database 111 and stores the results of calculations in the database 111. Conceivable incentive indices include electricity price when discharging from storage batteries is done and electricity green index of electricity. Other incentive indices may also be used.

A method of finding an incentive index using a green electricity index as one example of incentive index is described by referring to FIG. 14.

Figures 14A, 14B, 14C:
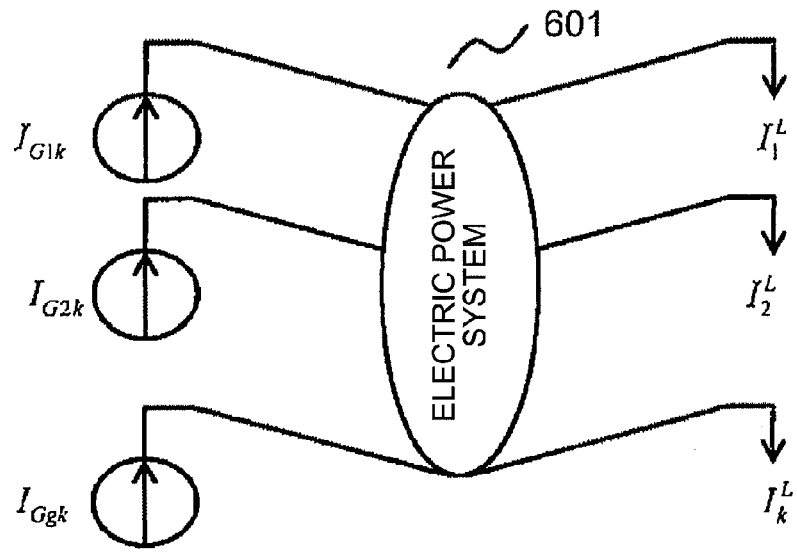
FIG. 14A is one example of method of calculating a green power index.
FIG. 14B is mathematical formula (1) used in FIG. 14A.
FIG. 14C is mathematical formula (2) used in FIG. 14A.

The principle on which a green electricity index is found is sought using a sensitivity coefficient indicating to what extent does the load vary when any arbitrary one of power generators represented as current sources is varied minutely, using an electricity equation shown in FIG. 14B (602) when the power generator and load of a subject electric power system are represented in terms of electrical currents as shown in FIG. 14A (601).

A specific method of calculation is described by referring to FIG. 15. With respect to a green electricity index, the configuration of an electric power system or power distribution system of a subject (not shown) is modeled into a device. Data created by the device about this electric power system of the subject is read in at processing 651. Based on this data, an admittance matrix is created at processing 652. At processing 653, a determinant shown in FIG. 14B (formula (1)) is created. Then, at processing 654, bus voltages occurring when only one current source out of the plural power generator nodes is mounted is calculated. At processing 655, tidal state of current generated by each power supply is calculated using the bus voltages and admittance matrix. Finally, at processing 656, distribution of load from the kth power generator to bus line i is calculated using FIG. 14C (formula (2)) from the currents and bus voltages. A $CO_2$-derived amount at each load, i.e., a green electricity index, is found by multiplying the found electricity derivation of the power generator by a CO2 exhaust factor defined for each type of power generation. One example of input data necessary to find a green electricity index is shown in FIG. 16. FIG. 16A (data 701) shows the end points and starting points of connections of power transmission lines, power distribution lines, and transformers that are known as branches of an electric power system from which a green electricity index should be found, as well as their parameters. The resistive components, inductive components, and capacitive components of the branches and tap ratios (in a case where each branch is a tap) are shown as examples. As another example of input data, a data example showing power generator outputs, known as nodes, and amounts of electricity consumption of loads is shown at 702. FIG. 16B (data 702) shows examples of data consisting of facility names of nodes, a flag indicating whether it is a power generator node, a specified value of voltage, initial value of voltage needed because a computation of a green electricity index uses a method of tidal stream calculation employing a general Newton method and thus repetitive calculation is used. Furthermore, other examples of data are shown. These are a specified amount of generated electricity of active power (PG) for each node, a specified amount of generated electricity of reactive power (QG), a specified amount of load of the active power (PL), a specified amount of load of the reactive power (QL), and an amount of introduced phase modifiers (such as static capacitors and shunt reactors). By using these input data, in the processing for calculating a green power index, the green power index can be found by converting into a green power index of each power generator and classifying the indices into fossil fuel electric power generation and renewal energy-derived as shown in the example of FIG. 16C (data 703).

Electricity price is shown as an incentive index in FIG. 17. The database 702 is composed of customer name, an amount of electricity purchased in a case where battery storages are charged, the amount being previously determined among customers managed by a power distribution device and the owners of the storage batteries, a unit price of purchased electricity, an amount of electricity sold in a case where discharging is done from the storage batteries, a unit price of electricity purchased, and a transaction period. Of course, additional items may be added to the shown example. Also, some items may be omitted.

The incentive calculating program has a function of synthesizing such incentive indices into one parameter. A parameter referred to herein synthesizes a function indicative of the degree of deterioration of each battery in the matrix switching program using the aforementioned Lagrange's method of undetermined multipliers.

[mathematical formula 4]

$$\text{The function is given by } F'(P_i)=G(\text{deterioration}(P_i), \text{greenlevel}(P_i),\text{price}(P_i), \ldots )$$  [mathematical formula 4]

deterioration($P_i$): deterioration factor of storage battery i
greenlevel($P_i$): green power level factor of storage battery i
price($P_i$): price of electricity purchased and sold for storage battery i The result of the synthesis is stored in the database 111. For other processing, when the matrix switching program in the first embodiment is executed, mathematical formulas 2 and 3 in the first embodiment may be calculated while using the function of the above-described mathematical formula 4 as a deterioration factor for storage batteries. Of course, when the number of incentive indices is increased or reduced and the matrix switching program is executed, a discharging pattern of storage batteries can be computed so as to maximize the incentive to the owners of storage batteries while suppressing the deterioration of performance of the storage batteries to a minimum by varying the function of the above-described mathematical formula 4 and, if great variations occur in the loads of the connected customers' devices, by varying the control according to the produced variations.

As shown thus far, a system shown in the second embodiment of the present invention and operating to distribute electric power by connecting customers' devices and storage batteries has the power control module, DC/AC conversion module, starting storage batteries, CPU & memory, secondary storage device having the matrix switching program, real time priority selecting program, incentive calculating program and database, I/Fs and switches for connected devices. If large variations occur in the loads on the connected customers' devices, a discharging pattern for the storage batteries is computed so as to maximize the incentive to the owners of the storage batteries while suppressing deterioration of the performance of the storage batteries to a minimum by varying the control according to the variations. Electric power can be supplied safely and stably according to the priorities of customers' devices. Furthermore, safe electric power, which prevents storage batteries from causing electrical leakage or eddy currents if electrical power from a system is not supplied, can be supplied stably to the connected customers' devices.

Embodiment 3

In the first and second embodiments of the present invention, supply of electric power within a geographic region of interest is achieved if the electric power from a system is lost due to a disaster or the like by causing the owners of storage batteries to offer the storage batteries and providing control such that deterioration of the storage batteries is minimized and the incentive is maximized at this time. In the first and second embodiments, a power distribution device judges the connections between the storage batteries and customers and controls the storage batteries such that deterioration of the storage batteries is minimized or the incentive that the owners of the storage batteries want is maximized without external triggers. In contrast, in the present embodiment, or the third embodiment of the present invention, storage batteries are controlled by an external trigger.

Figure 18:
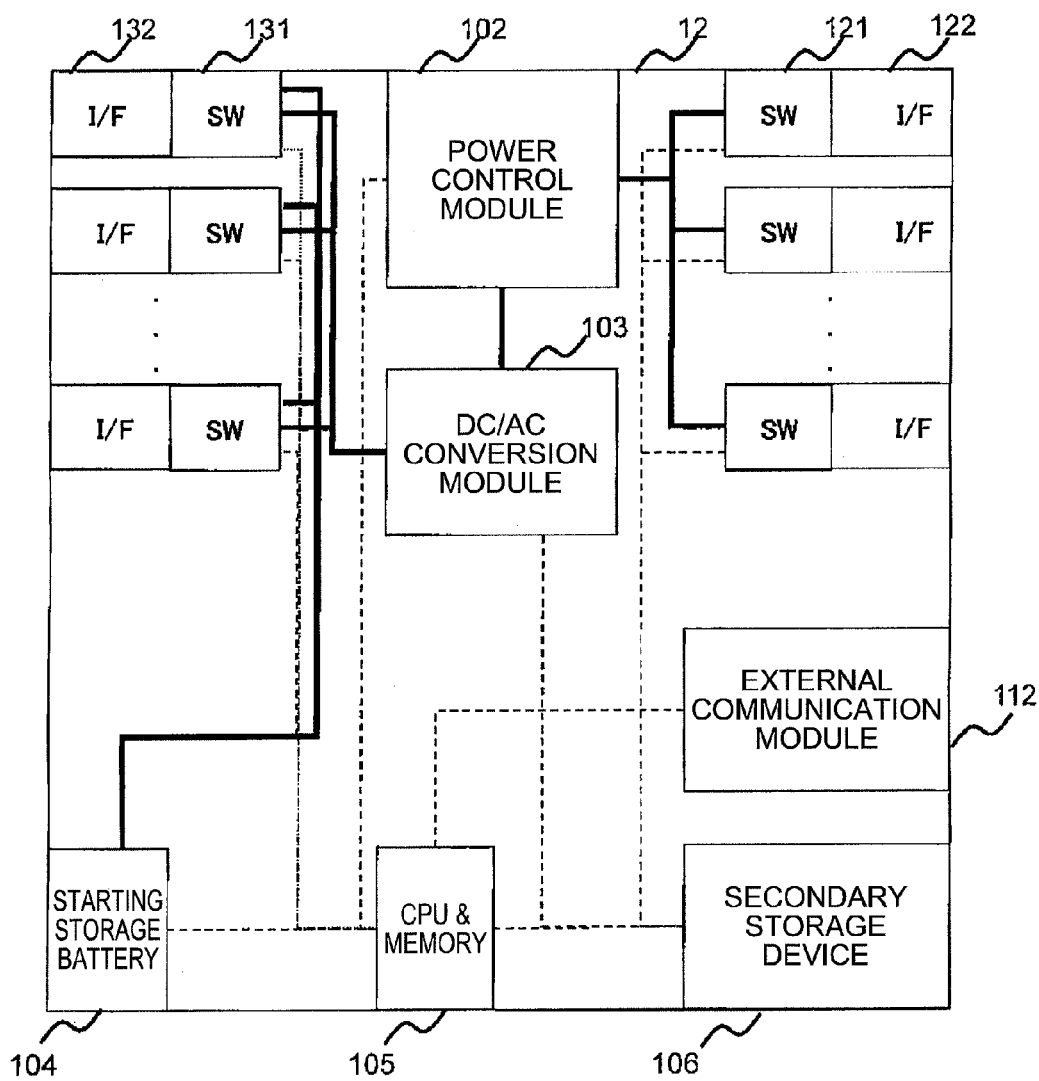
FIG. 18 is a second embodiment of power distribution device.

FIG. 18 shows an example of configuration of a power distribution device that achieves the above-described function of the present embodiment. The difference of the power distribution device, 12, in FIG. 18 with FIG. 1 is that there is provided an external communication device 112. The external communication module 112 is connected with an external network, receives a control instruction signal from the outside, executes a program within a secondary storage device according to the state of the signal, transfers the calculated control value to a power control module, and distributes electric power between storage batteries and equipment creating a demand.

Figure 19:
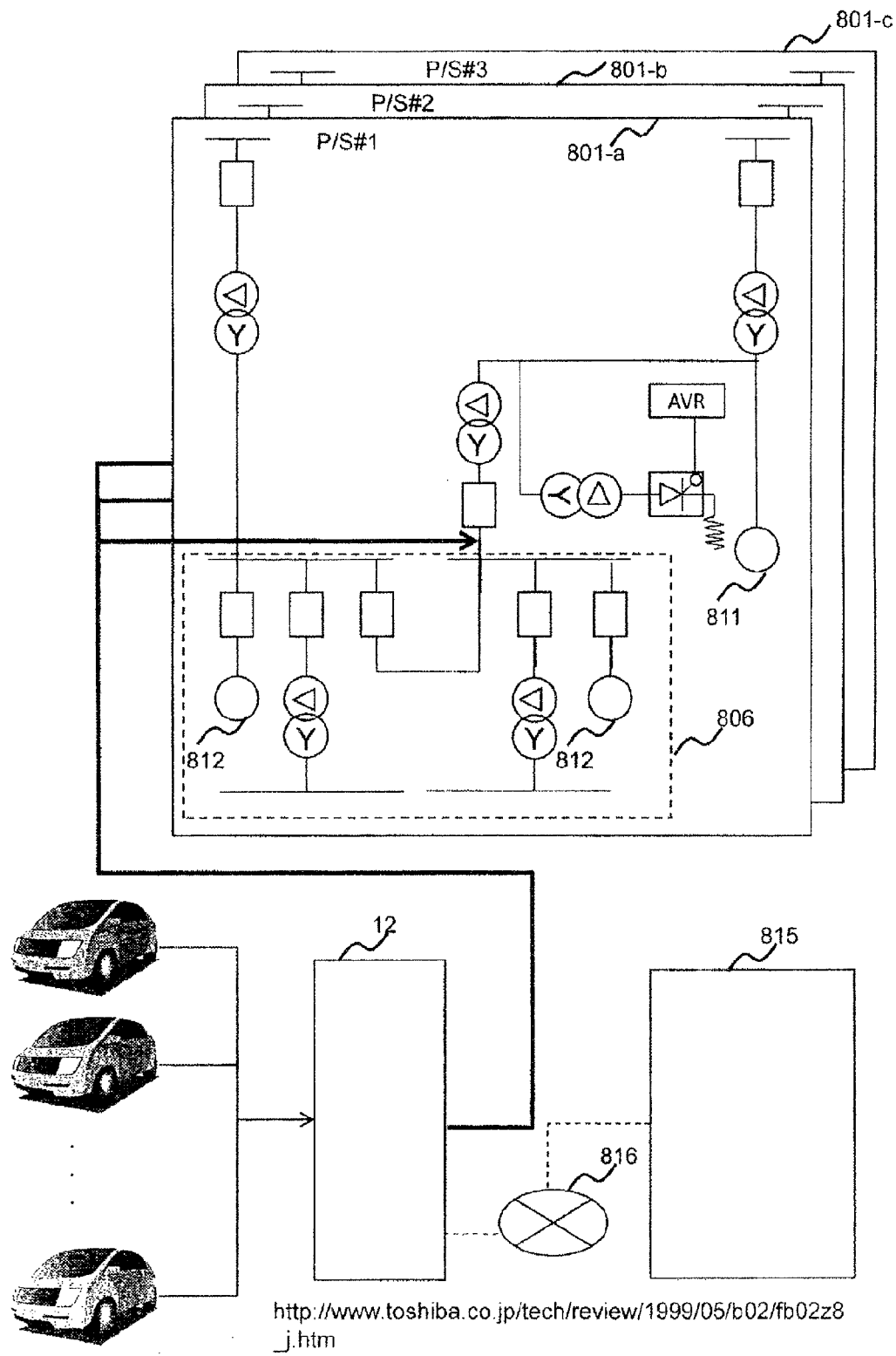
FIG. 19 is an embodiment when the second embodiment of power distribution device is actually applied.

FIG. 19 shows an example of control using the present embodiment. One series of power generators in a general, well-known power generation plant is indicated by 801-a to 801-c. The body of a power generator is indicated by 811. Indicated by 812 is an auxiliary electric motor. Indicated by 806 are portions referred to as auxiliary machinery. Indicated by 815 is central equipment of the power generation plant. Indicated by 12 is the power distribution device in the present embodiment. 12 and 815 are connected by a network 816. An I/F 122 on the customer side within the power distribution device is connected to the rear stage of a switch located in a stage preceding the auxiliary machinery 806 of each power generation plant. The auxiliary machinery operates in lieu of a power supply for activating the power generation plant 811 and acts to supply electric power. Because of this configuration, if the electric power system causes a blackout due to a disaster or the like, the time taken to cold start the power generators can be shortened. Generally, if the electric power system causes a blackout, all the power generation plants come to a stop, and electric power supplied is not available, then the circumstances of the facilities are checked. Then, electric power is generated by natural energy such as by hydropower generation. The electric power is transmitted to a power generation plant, thus activating the auxiliary 812 in the power generation plant. This starts the auxiliary machinery 806. The power generator 811 is activated by the produced electric power. This series of works is time consuming. Therefore, to hasten recovery of the power generation plant, the auxiliary machinery in the power generation plant is quickly activated with electric power from the power distribution device using storage batteries. The electricity infrastructure can be quickly recovered.

Figure 20:
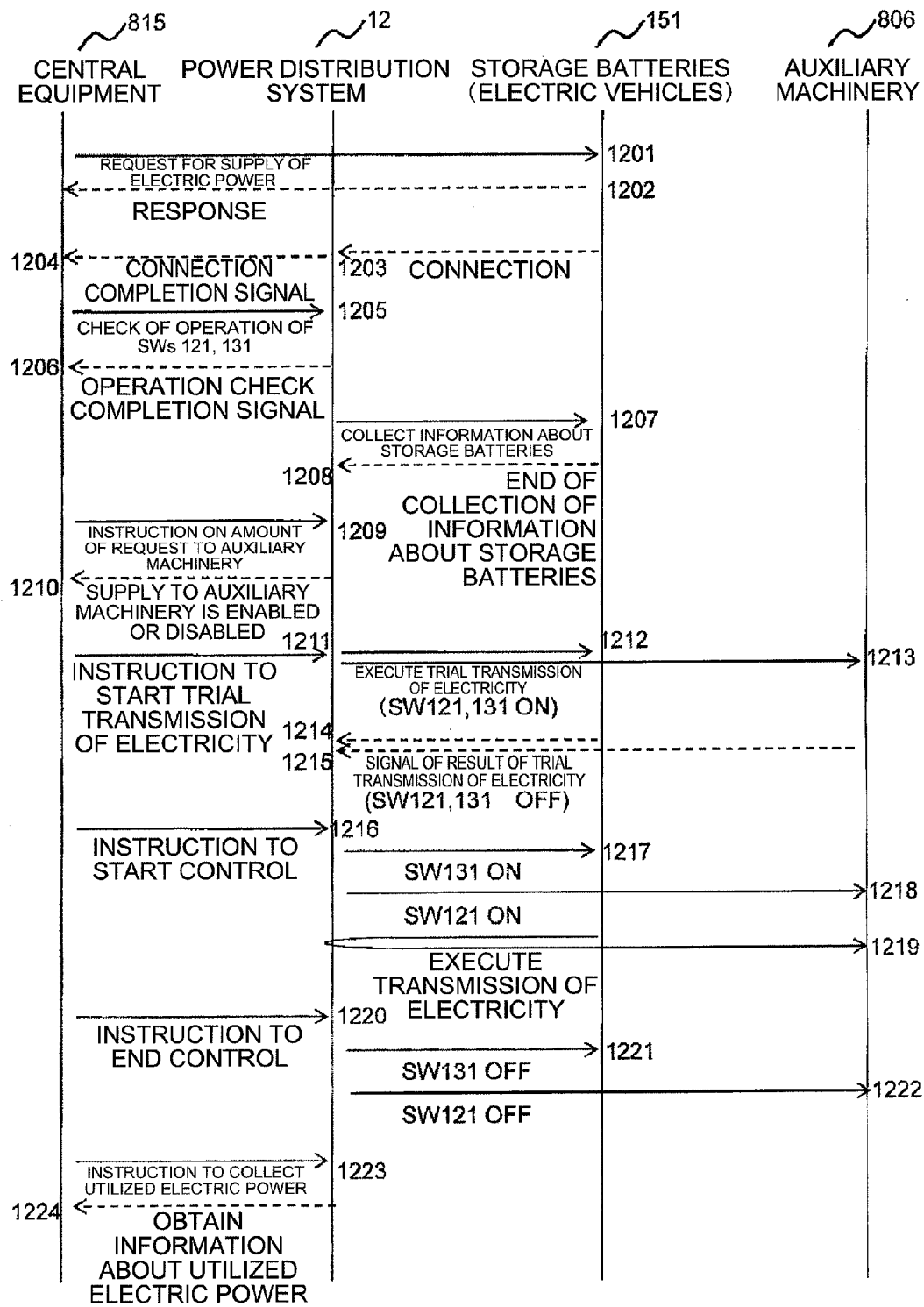
FIG. 20 is one example of flow of processing in the second embodiment of power distribution device.

The flow of processing in the present embodiment is described by referring to FIG. 20. In the present embodiment, it is assumed that storage batteries are an electric vehicle. When a blackout occurs and a complete electrical outage takes place, the central equipment 815 issues a request for supply of electric power to the electric vehicles 151. A notice of the request for supply of electric power is given to a previously registered user of the vehicle via a navigation system or via a mobile terminal (1201). The user of the electric vehicle sends a notice indicating whether or not this request is accepted to the central equipment 815 (1202). At the same time, the user of the electric vehicle who complies with the request connects the electric vehicle with the power distribution device (1203). After a lapse of a given time, the power distribution device 12 sends a signal indicative of completion of the connection of the electric vehicle to the central equipment (1204). If the connection of the electric vehicle can be checked in the central equipment 815, the central equipment 815 checks the operation of switches 121 and 131 of the power distribution device (1205). A decision is made depending on whether there is a response by transmitting a signal to each switch. The power distribution device 12 sends an operation checking signal to the central equipment 815 (1206). The central equipment senses whether the power distribution device operates normally.

On the other hand, the power distribution device 12 transmits a signal for asking for acquisition of information about the storage batteries shown in FIG. 7 to the controller for the storage batteries which are installed in the connected electric vehicle (1207). After the power distribution device 12 obtains information about the storage batteries from the controller for the storage batteries (1208), the central equipment 815 transmits an amount of electricity required by the auxiliary machinery to the power distribution device 12 (1209). Based on data collected at 1208 and 1209, the power distribution device 12 makes a decision as to whether there is a strained supply and demand relationship with the storage batteries connected with the auxiliary machinery 806. The result is transmitted to the central equipment 815 (1210). Based on the result, the central equipment 815 sends an instruction to the power distribution device to start a trial transmission of electricity (1211). The power distribution device 12 receiving the signal turns ON the I/F switches 131 for the electric vehicle and the I/F switch 121 for the auxiliary machinery of the power generator, thus carrying out the trial transmission of electricity (1212, 1213). After the execution of the trial transmission of electricity, the power distribution device 12 receives an ACK signal from the electric vehicles 151 and auxiliary machinery 806 to know whether the transmission has been performed normally (1214, 1215). At the same time, the switches 121 and 131 are turned OFF. If ACK returns normally, the central equipment 815 issues an instruction for starting control to the power distribution device (1216). If this signal is received by the power distribution device 12, the switches 131 being I/Fs for the electric vehicle and the switches 121 being I/Fs for the auxiliary machinery are turned ON (1217, 1218). Transmission of electricity is carried out (1219). Here, transmission of electricity is performed using the matrix switching program shown in the first and second embodiments. The real time priority determining program executes the program by making identical the priorities of all units of auxiliary machinery. When a given time has passed, when the electric power from the storage batteries have fallen below a given level, or when the electric power is recovered, the central equipment 815 transmits an instruction for ending the control to the power distribution device 12 (1220). The power distribution device 12 receiving this signal turns OFF the switches 121 and 131 (1221, 1222). Then, the central equipment 815 gives an instruction for transmitting information about the amount of electricity released from the electric vehicles 151 to the power distribution device 12 as ending processing (1223). After obtaining the information (1224), the data is stored in the database within the central equipment to perform accounting or other processing.

As shown thus far, the power distribution system shown in the third embodiment of the present invention and operating to quickly recover power generators from a blackout by connecting the auxiliary machinery of the power generation plant and storage batteries and supplying electric power to the auxiliary machinery has the power control module, DC/AC conversion module, starting storage batteries, CPU & memory, secondary storage device having the matrix switching program, real time priority selecting program, incentive calculating program, and database, and I/Fs and switches for connected devices. If large variations occur in the loads of the connected auxiliary machinery, a discharging pattern for the storage batteries is computed so as to maximize the incentive to the owners of the storage batteries while suppressing deterioration of the performance of the storage batteries to a minimum by varying the control according to the variations. Furthermore, when electric power from the system is not supplied due to a disaster or the like, the power generator output can be recovered quickly by activating the auxiliary machinery of the power generators under a safe condition where the storage batteries are prevented from causing electrical leakage or eddy currents. Electric power can be supplied stably in this geographic region.

Embodiment 4

In the first through third embodiments, the power distribution device controls the flow of electric power in one direction between the power supply side and the consumer side via an I/F. In contrast, in the fourth embodiment of the present invention, supply of electric power is secured stably independent of external power systems by controlling the flows of electric power in both directions between the supplier side and the consumer side.

Figure 21:
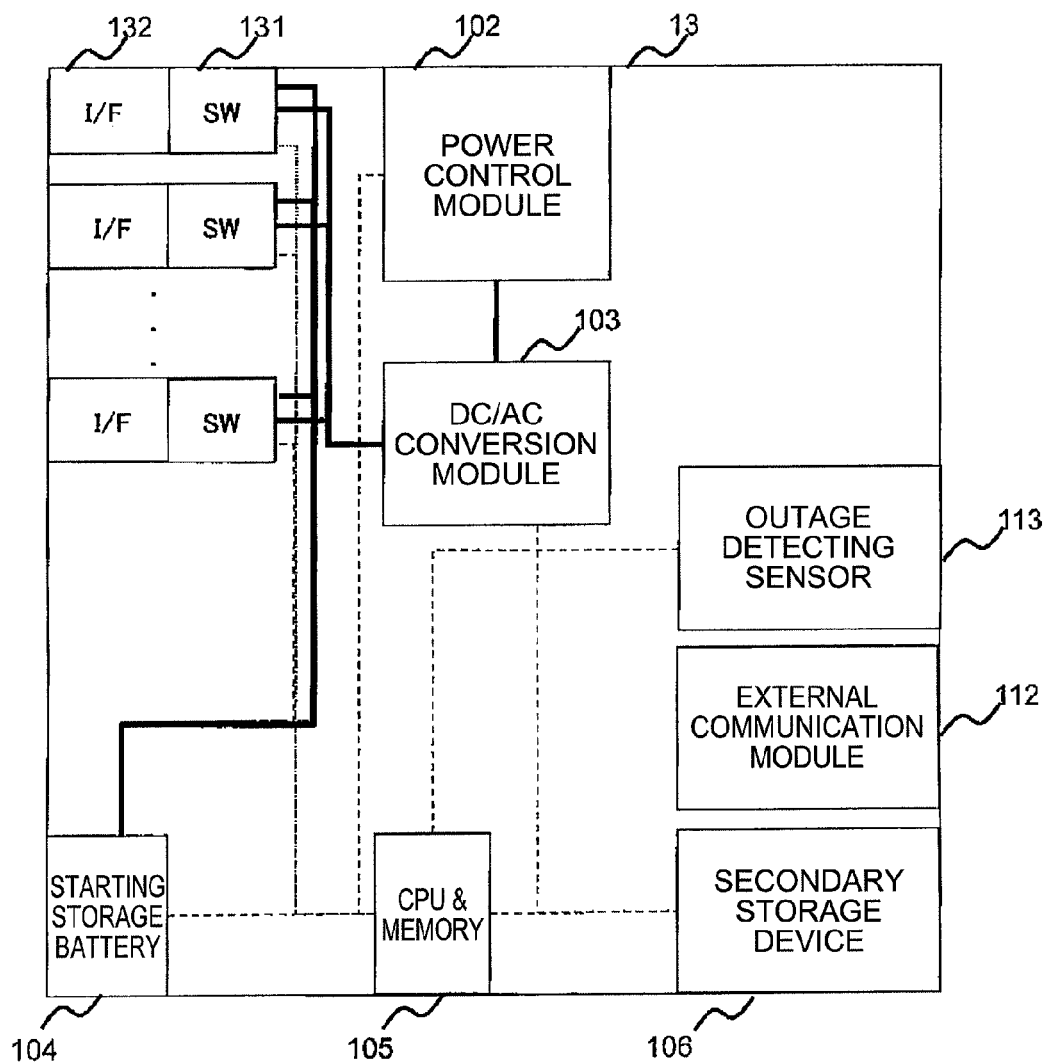
FIG. 21 is a third embodiment of power distribution device.

An example of configuration of the present embodiment is shown in FIG. 21. The power distribution device of the present embodiment interchanges electric power in real time with minimum deterioration of the storage batteries owned by the customers between storage batteries, for example, located below pole-mounted transformers and plural customers having any load facility or equipped with only load facilities when supply of electric power is totally interrupted. Alternatively, in this embodiment, if supply of electric power is not totally interrupted, electric power stored nighttime can be used in the daytime. Therefore, the embodiment can be used for peak shifting. An example of configuration of the power distribution device in the present embodiment is shown in FIG. 21. The power distribution device, 13, of the present embodiment consists of I/Fs 132 for connection with customers, switches 131 mounted between the I/Fs and modules of the power distribution device when connections are made with the customers, a power control module 102 for distributing electric power released from the storage batteries located within the customers to the load side, a DC/AC conversion module 103 for converting electric power delivered from the storage batteries into AC power used as a general load when the delivered electric power is AC power, a starting storage battery 104 for starting the power distribution device even in the event of a total blackout, a CPU & memory 105 for driving the power distribution device, a secondary storage device 106 in which a program and a database for driving the power distribution device are stored, an outage detecting sensor for detecting whether an outage occurs in an external electric power system, and an external communication module 112 for performing communications with an external communication device. The secondary storage device 106, CPU & memory 105, starting storage batteries 104, power control module 102, DC/AC conversion module 103, storage battery side switch 131, and outage detecting sensor 113 are connected by communication lines.

Figure 22:
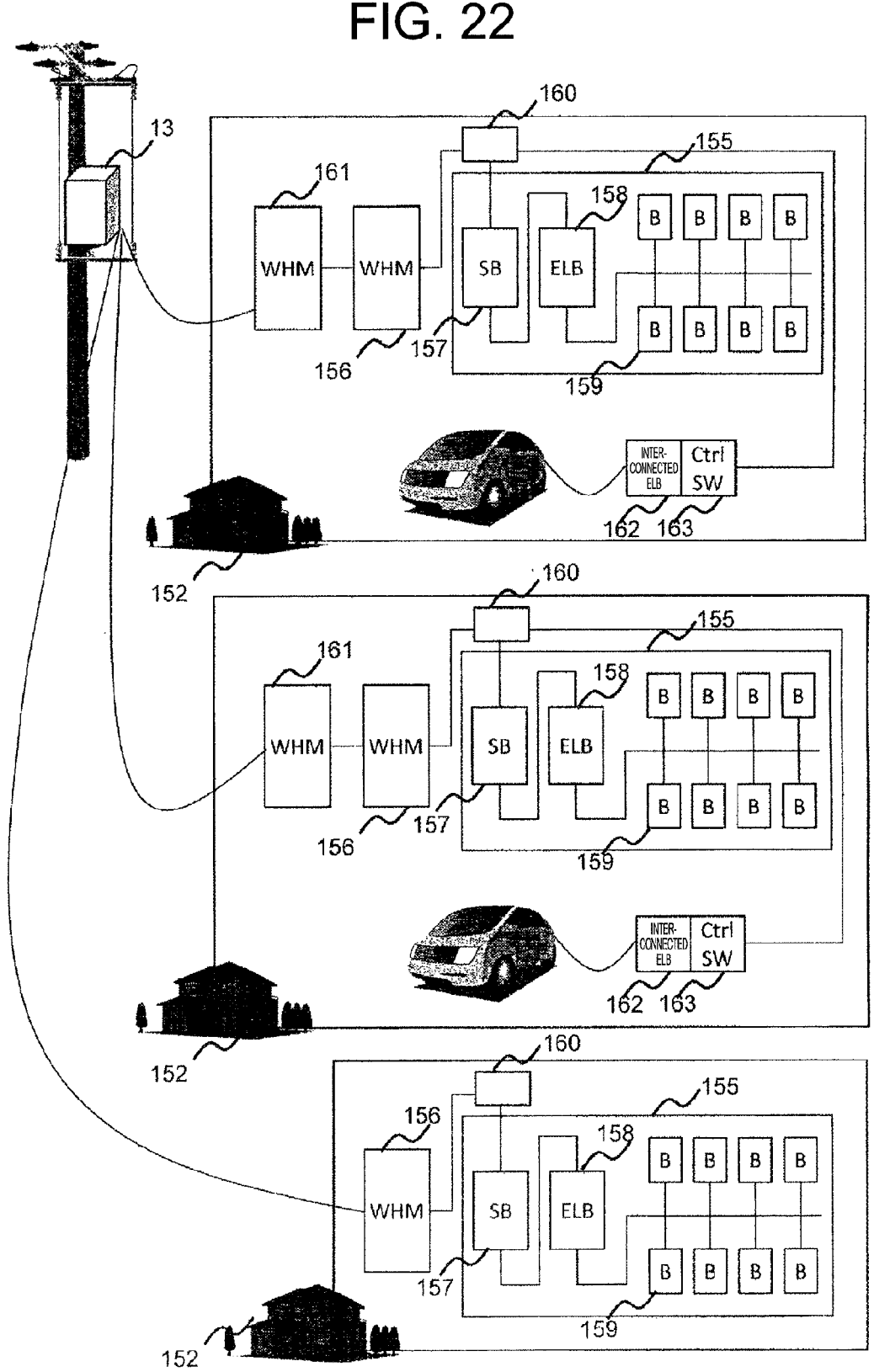
FIG. 22 is an embodiment when the third embodiment of power distribution device is actually applied.
Figure 23:
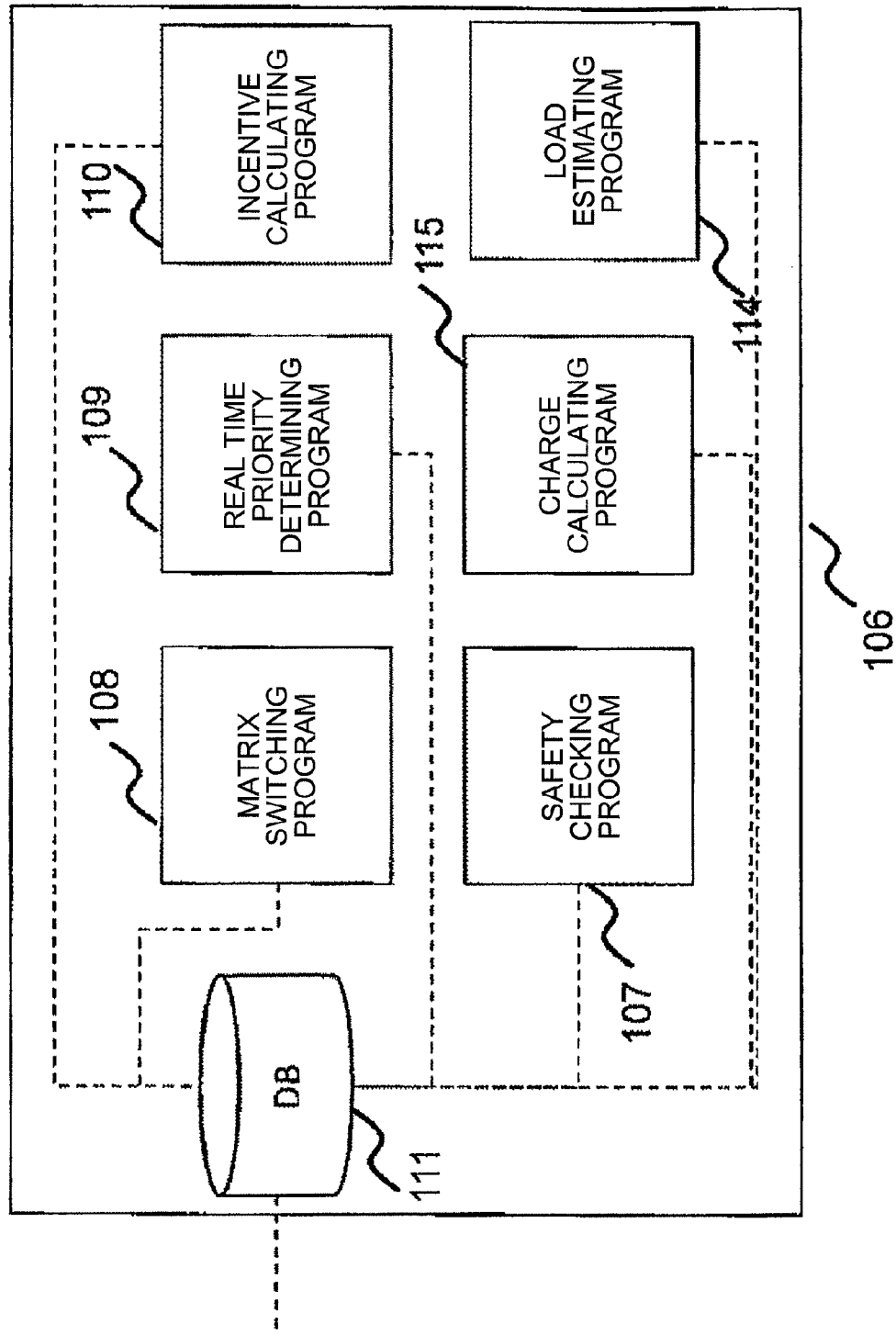
FIG. 23 is one example of configuration of a secondary storage device in the third embodiment of power distribution device.

FIG. 22 shows an example of realization using the power distribution device 13 in the fourth embodiment. The power distribution device 13 juxtapositionally mounted in the pole-mounted transformer is connected with customers by electricity distribution lines. In the present embodiment, communication signals typified by PLC (Power Line Communication) signals are superimposed on the distribution lines as well as electric power. The customers 152 have storage batteries. Alternatively, in the case of customers owning electric vehicles, they may have the electricity meters 156 for purchase of electricity and electricity meters 161 for selling of electricity as outdoor facilities. An indoor distribution board 155 exists as an indoor facility. An interconnected ELB (earth leakage breaker) 162 and a control switch 163 exist as facilities on the side of storage batteries. A controller 160 interconnects the indoor distribution board 155 and the storage battery facilities. Electric power used indoors is coupled to branch breakers 159 via the contracted power circuit breaker 157 and the earth leakage breaker 158. From here, electric power is supplied to the general load. An outage detecting sensor included in the power distribution device 13 is monitoring the measured value of a current sensor or power sensor secured to or in the pole-mounted transformer that is juxtapositionally mounted. When an outage occurs, the resulting variations in the state are stored in the database within the secondary storage device of the power distribution device. At normal times, the power distribution device 13 operates using the electric power from the electric power system. On the other hand, when the electric power from the electric power system is interrupted, the power distribution device is operated normally using the starting storage battery 104. As shown in FIG. 23, the secondary storage device 106 has a database 111, a matrix switching program 108, a real time priority determining program 109, an incentive calculating program 110, a load estimating program 114, a safety checking program 107, and a charge calculating program 115. The programs are connected with the database 111. The load estimating program is a program which takes a moving average, for example, based on amounts of current or amounts of electricity taken at regular intervals by an outage detecting sensor and is stored in the database 111 and which thus estimates future amounts of load in the geographical region to which the present device is connected.

Figure 24:
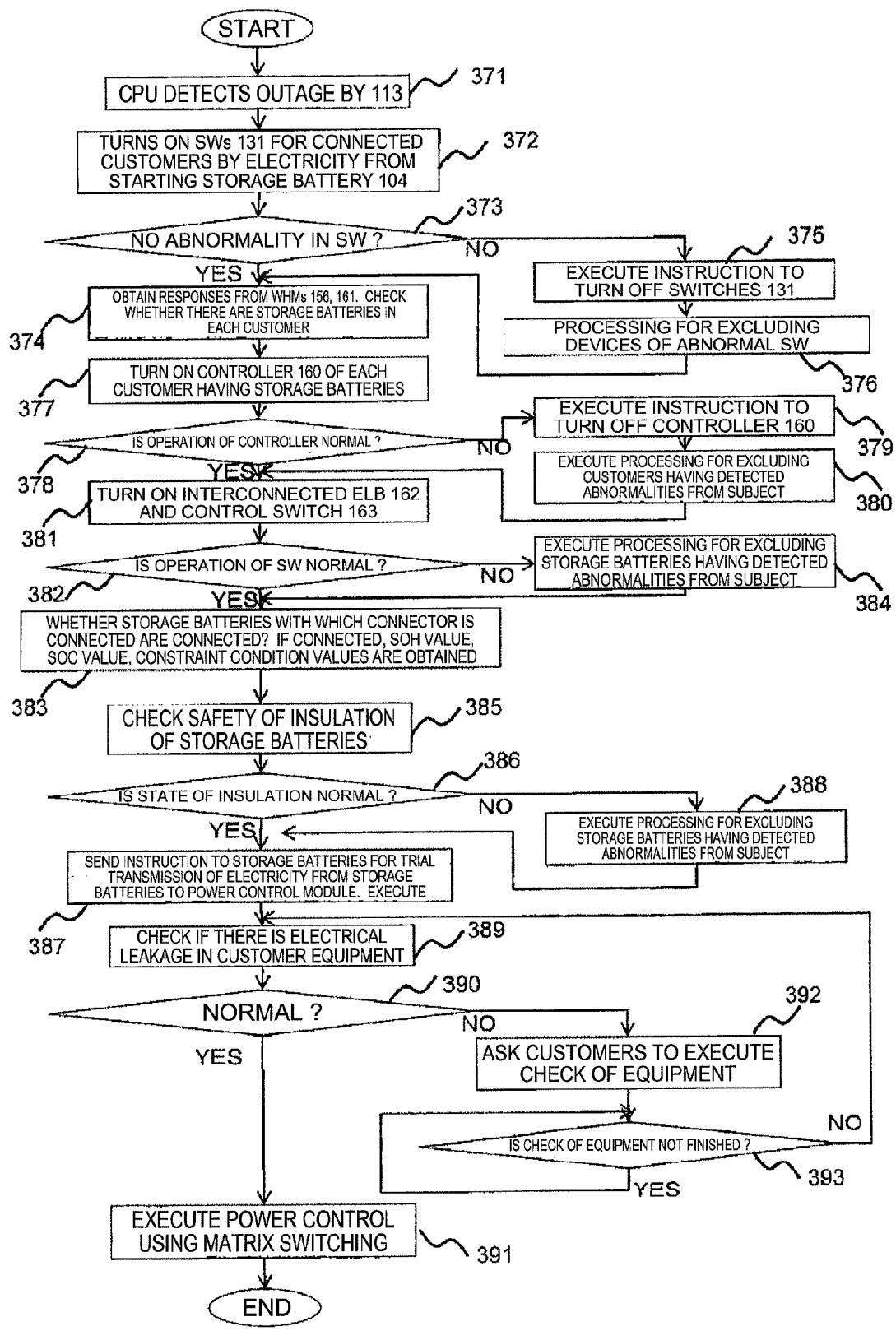
FIG. 24 is one example of flowchart of a safety checking program in the secondary storage device.

The contents of processing performed by the safety checking program 107 in the present embodiment are described by referring to FIG. 24. In the safety checking program 107, if the outage detecting module 113 detects generation of an outage at processing 371, a power supply within the power distribution device is secured from a starting storage battery 104 within the power distribution device at processing 372 in order to activate the inoperative functions of the power distribution device. At the same time, all the switches 131 directed for customers and connected with the power distribution device 13 are turned ON. At processing 373, a check is made as to whether all the switches 131 are abnormal. If any switch is abnormal, the corresponding switch 131 is turned OFF at processing 375. At processing 376, processing for excluding the customer of the abnormal switch is performed. If no abnormality is found at processing 373, a decision is made as to whether the meter 156 for purchase of electricity and the meter 161 for selling of electricity are connected with each customer at processing 374. If there is the meter for purchase of electricity, it is shown that there is equipment for supplying electric power to the outside. Conversely, if there is no meter for selling of electricity, it can be seen that the customer is merely a load. Then, at processing 377, an attempt is made to activate the controller 160 of the customer connected by PLC communications for the customer having the meter for selling of electricity. If the controller operates correctly and is activated at processing 378, the interconnected ELB 162 and control switch 163 installed on the storage battery side are electrically energized and their operation is checked at processing 381. If the operation of the controller is abnormal at processing 378, the controller of the customer is turned OFF at processing 379. At processing 380, processing for excluding the customer for which an abnormality has been detected from the subject is performed. Then, at processing 382, if the operation of the control switch is judged to be normal, at processing 383, information about whether the storage battery located downstream of the interconnected ELB 162 is connected is obtained. If it is connected, information about the storage battery and shown in FIG. 7 is obtained. If there is any customer having the control switch whose operation is not normal at processing 382, processing for excluding the storage battery for which an abnormality has been detected from the subject of control is performed at processing 384. After the end of processing 383, the safety of the insulation of the storage battery is checked at processing 385. This is carried out by temporarily turning ON the control switch 163 and detecting whether the electric power detected by the controller falls within a preset normal range. If the decision at processing 386 is that the state of insulation is normal, the controller 160 is controlled at processing 387. An instruction is sent to the controller 160 and control switch 163 to electrically charge from the storage battery to the power control module 102 on a trial basis, and trial charging is carried out. If any abnormality in the state of insulation is detected at processing 386, processing for excluding the storage battery having a detected abnormality from the subject is performed at processing 388. Excluding the storage battery having a detected abnormality from the subject at processing 384 and processing 388 is realized by turning OFF the associated switch 163 and controller 160. When trial charging is done at processing 387, a check is performed at processing 389 as to whether the equipment on the customer side has electrical leakage by measuring the current or electric power passing through the controller 160. After checking that there is no electrical leakage and the condition is normal at processing 390, electric power is controlled using matrix switching. If electrical leakage in the equipment of the customer is detected at processing 390, the customer is asked to check the equipment at processing 392. If the check of the equipment has ended at processing 393, control again returns to processing 389, where the processing is continued. The operation of the safety checking program in the present embodiment has been described so far.

Figure 25:
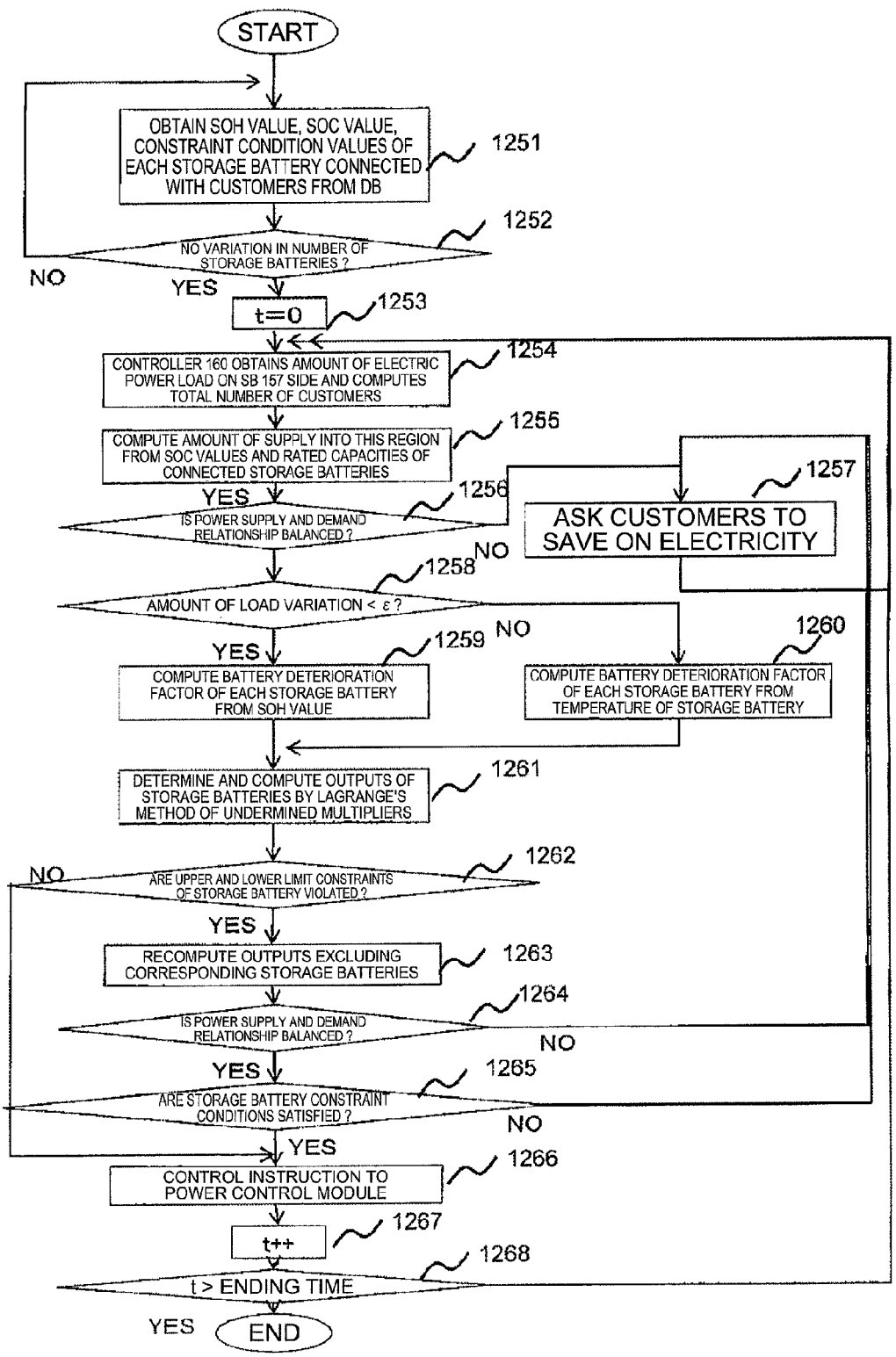
FIG. 25 is one example of processing of a matrix switching program in the secondary storage device.

The operation of the matrix switching program in the present embodiment is described by referring to FIG. 25. First, at processing 1251, parameters and constraint condition values (shown in FIG. 7) for the storage battery connected with the customer are obtained from the database 111. A decision is made as to whether the number of storage batteries of the subject is increased or reduced at processing 1252. In a case where an electric vehicle is assumed to be a storage battery, a situation where the electric vehicle will return to the customer while electric power is being transmitted in the power distribution device or a situation where the electric vehicle will leave the customer because there is an urgent business when the power distribution device is carrying out transmission of electric power is dealt with. If the decision at processing 1252 is that the number of storage batteries is increased or reduced as compared with the previous time cycle, control returns to processing 1251, where the processing is continued. If the decision at processing 1252 is that the number of storage batteries does not vary, the time counter is reset at processing 1253. Then, at processing 1254, the amount of electric power demanded on the contracted power circuit breaker 157 is obtained from the controller 160 of each customer. At this instant of time, the total demand of the customers under control of the power distribution device is calculated. Alternatively, if precise values cannot be detected from the controller, the total demand may be computed using the load estimating program 114. If the decision at processing 1256 is that the total capacity of the storage batteries (obtained at processing 1251) capable of being discharged is smaller than the total capacity of the electric power load found at 1255, the customers are asked to save on electricity at processing 1257, and then control returns to processing 1254. If the decision at processing 1256 is that the demand and supply relationship is tight, a decision is made at processing 1258 as to whether the amount of variation of the demand is greater than a preset value $\epsilon$. If it is smaller than $\epsilon$, the battery deterioration factor of each storage battery is found from parameters obtained at processing 1251 regarding the storage batteries at processing 1259. Then, as shown in the first embodiment, a calculation for determining the output of each battery by a Lagrange's method of undetermined multipliers is performed. If the decision at processing 1258 is that the amount of variation of the demand is greater than $\epsilon$, it follows that there is a rapid load variation and so the temperatures of the storage batteries need to be taken into account when the electric powers of the storage batteries are computed at that time. Therefore, at processing 1260, the battery deterioration factors of the storage batteries are calculated from the temperatures of the storage batteries.

Then, at processing 1261, a calculation of the outputs of the storage batteries is determined by a Lagrange's method of undermined multipliers. If the found outputs of the storage batteries do not violate the upper and lower limit constraints, a control instruction is sent to the power control module 102 at processing 1266. The calculated output instructions for the storage batteries are sent to the controller for the storage batteries. If the decision at processing 1262 is that the upper and lower limit constraints of the storage batteries are violated, the corresponding storage batteries are excluded at processing 1263. Then, at processing 1264, a decision is made as to whether the power supply and demand conditions are satisfied. If electric power demand and supply relationship is balanced, a decision is made at processing 1265 as to whether storage battery constraint conditions are satisfied. If the conditions are satisfied, the outputs of the storage batteries are again calculated by a Lagrange's method of undermined multipliers, and then control goes to processing 1266. If the decision at processing 1264 is that the electric power demand and supply is not balanced, the customers are asked to save on electricity at processing 1257. Control starts again at processing 1254. If the decision at processing 1265 is that the storage battery constraint conditions are not satisfied, control also returns to processing 1257. Similar processing is performed. When one cycle of processing described so far has ended, the time counter is incremented at processing 1267. A decision is made at processing 1268 as to whether the initial scheduled control time is exceeded. If the scheduled control time is exceeded, the processing is ended. If not exceeded, control returns to processing 1254, and the processing is repeated.

Figure 26:
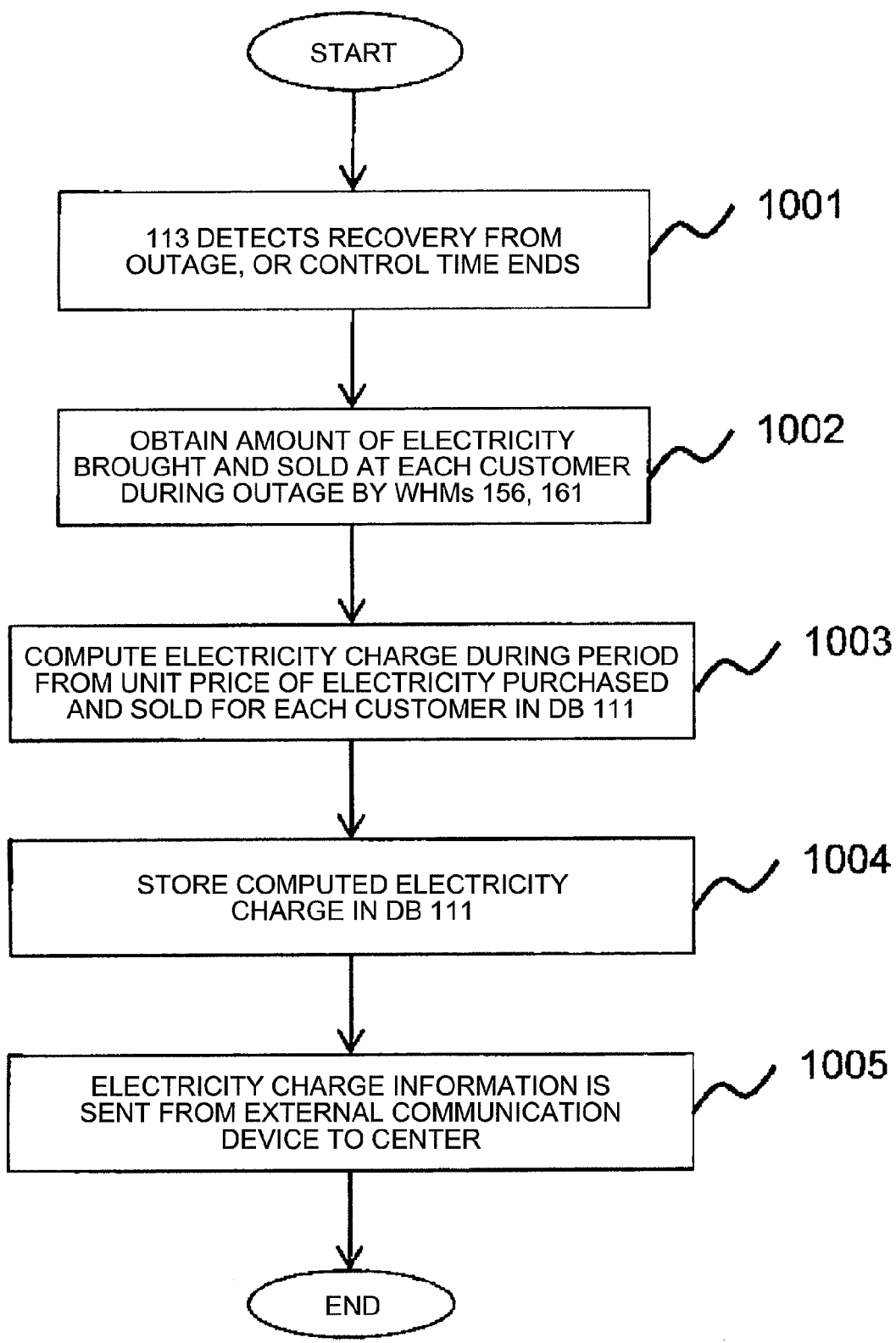
FIG. 26 is one example of accounting.

The accounting calculating program in the secondary storage device 106 is next described by referring to FIG. 26. After the outage detecting sensor 113 detects a recovery from an outage or a time parameter t existing in the explanation of the matrix switching program has exceeded a preset value, the amounts of electric power purchased or sold by the customers during outage are obtained from the electricity meters 156 for purchase of electricity and from the electricity meter 161 for selling of electricity, at processing 1001. Then, at processing 1003, the electricity charges during an outage are calculated from the unit price of electricity purchased and sold for each customer, the unit price being present in the data 702 within the database 111. The calculated electricity charges are stored in the database 111 at processing 1004. Finally, at processing 1005, information about the electricity charges is sent from the external communication module 112 to an accounting center (not shown).

As shown thus far, when a total power interruption occurs between storage batteries under control of a power distribution device located, for example, below a pole-mounted transformer and as shown in the fourth embodiment of the present invention and a plurality of customers each being any type of load equipment or equipped with only load equipment, a quick decision is made as to whether electrical leakage or eddy currents are produced within the customers, using an outage detecting sensor. Deterioration of the storage batteries under the control of the power distribution device is suppressed to a minimum. Stable supply of electric power can be secured in real time independent of external electric power systems.

Furthermore, the provision of the incentive calculating apparatus in the secondary storage device within the fourth embodiment of the present invention makes it possible, if great load variations occur in the connected customers' devices, to calculate a storage battery discharging pattern so as to maximize the incentive to the owners of the storage batteries while suppressing deterioration of the performance of the storage batteries to a minimum by varying the control according to the variations and to supply electric power safely and stably according to the priorities of the customers' devices as shown in the second embodiment of the present invention. In addition, if electric power from a system is not supplied to the connected customers' devices, electric power can be secured safely and stably without the storage batteries producing electrical leakage or eddy currents independent of external electric power systems.

Embodiment 5

In a fifth embodiment of the present invention, stable supply of electric power is secured in cooperation with an external power distribution device under an instruction from an external host power monitoring control system by controlling bidirectional flows of electric power on the supplier side and on the consumer side.

Figure 27:
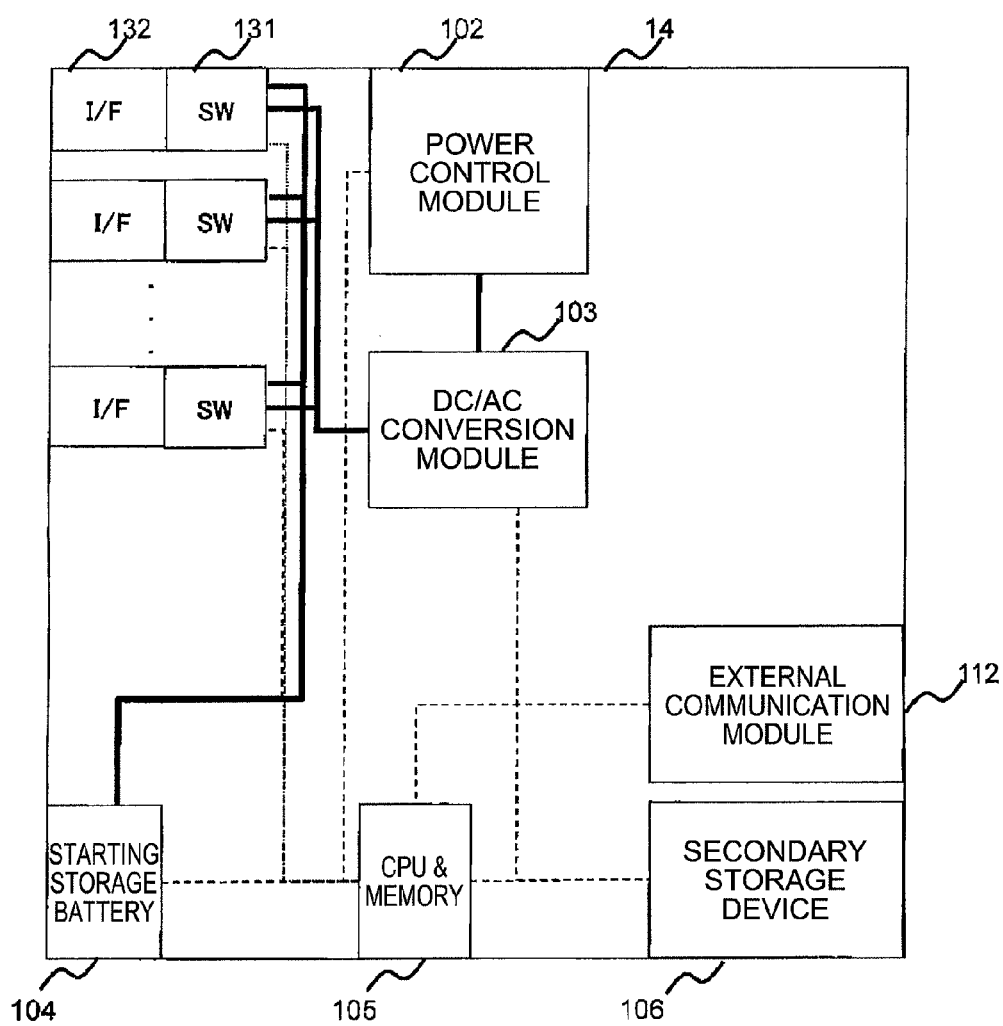
FIG. 27 is a fourth embodiment of power distribution device.

An example of configuration of a power distribution device that realizes the present embodiment is described by referring to FIG. 27. The power distribution device, 14, of the present embodiment consists of I/Fs 132 for connection with customers, switches 131 mounted between the I/Fs and the modules of the power distribution device when connections with the customers are made, a power control module 102 for distributing electric power released from the storage batteries located within the customers to the load sides, a DC/AC conversion module 103 for converting the electric power delivered from the storage batteries into AC electric power used as a general load when the delivered electric power is AC power, a starting storage battery 104 for starting the power distribution device even in the event of a total blackout, a CPU & memory 105 for driving the power distribution device, a secondary storage device 106 in which a program for driving the power distribution device and a database are stored, and an external communication module 112 for performing communications with an external communication device. The secondary storage device 106, CPU & memory 105, starting storage battery 104, power control module 102, DC/AC conversion module 103, and customer side switches 131 are connected by communication lines.

Figure 28:
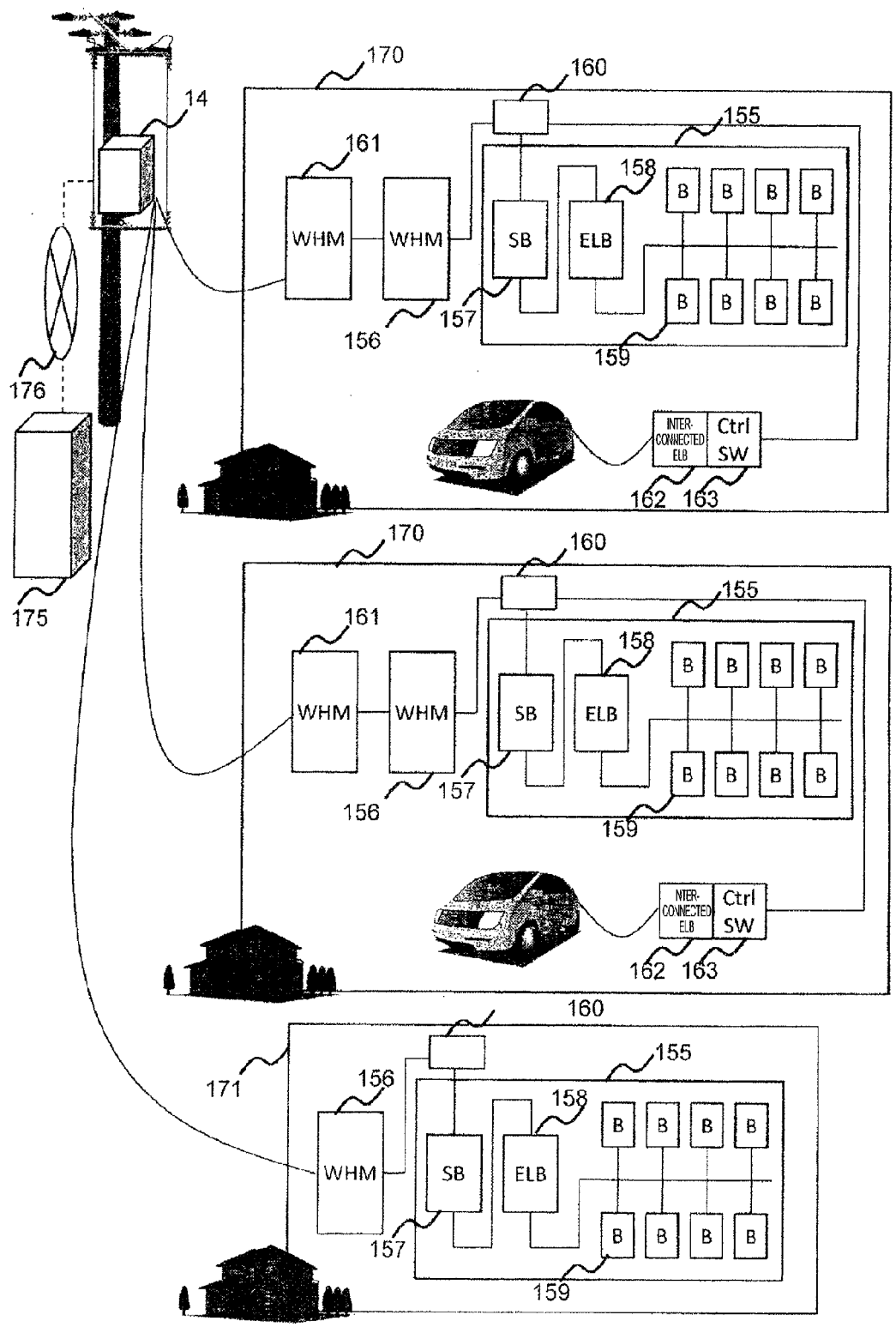
FIG. 28 is an embodiment when the fourth embodiment of power distribution device is actually applied.

An actual example of realization using the power distribution device 14 in the fifth embodiment is shown in FIG. 28. The power distribution device 14 mounted on a pole-mounted transformer in a juxtapositional relation thereto is connected with a host power control monitoring system 175 via a network 176. Data such as a charging and discharging asking signal from the host power control monitoring system to the power distribution device and amounts of charging and discharging required is sent and received to and from this network. The power distribution system 14 is connected to the customers by power distribution lines in the same way as in the fourth embodiment. The customers 152 are also designed in the same way as in the fourth embodiment. The secondary storage device 106 is similar to the fourth embodiment. In the present embodiment, the contents of a safety checking program and a matrix switching program which are different in processing with the fourth embodiment are chiefly described.

Figure 29:
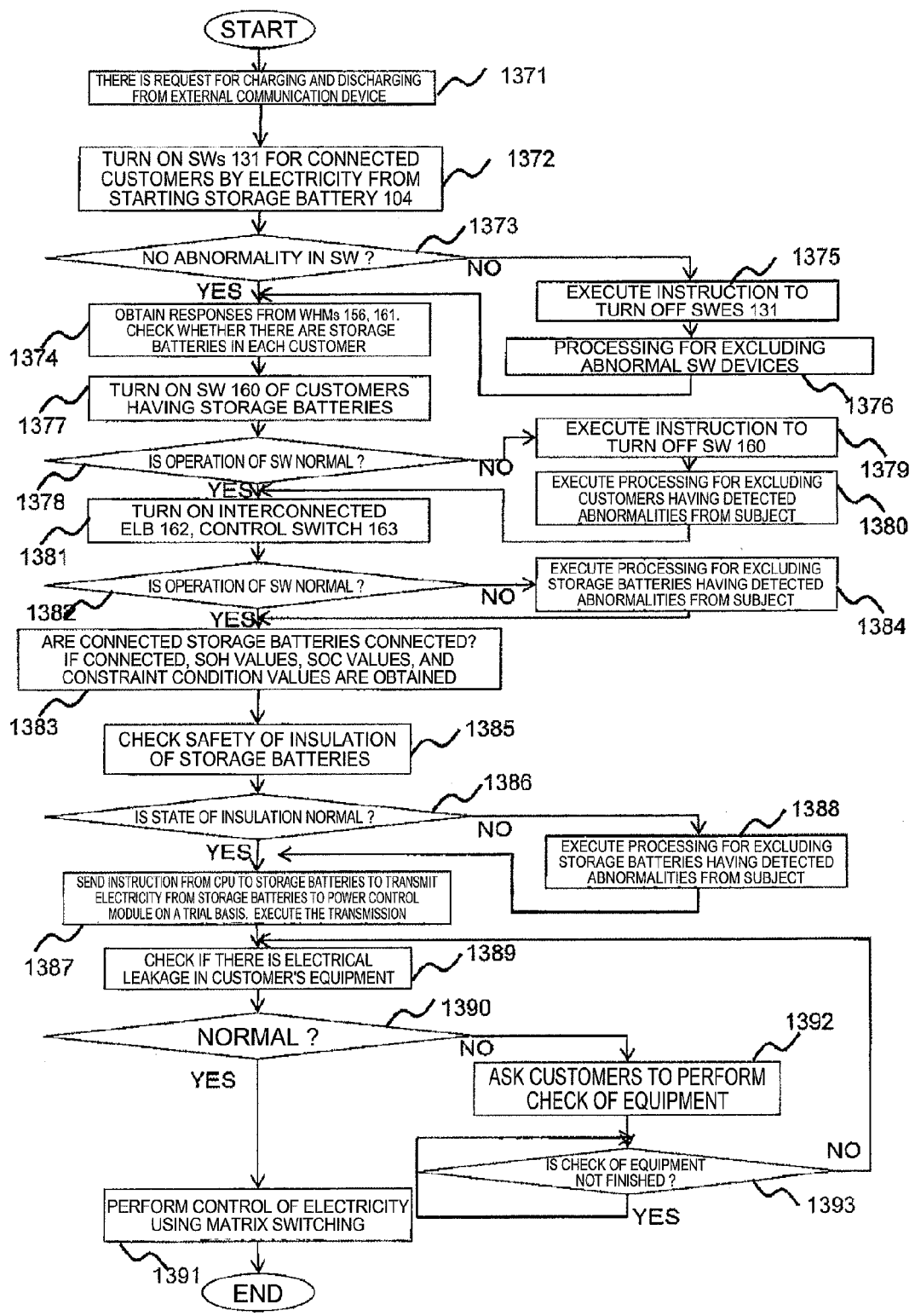
FIG. 29 is one example of flowchart of a safety checking program in a secondary storage device.

The contents of processing of the safety checking program 107 in the present embodiment are described by referring to FIG. 29. In the safety checking program 107, if a request for charging and discharging arrives from the host power monitoring control system via an external communication device at processing 1371, the power supply within the power distribution device is secured from the starting storage battery 104 within the power distribution device at processing 1372 to activate the functions of the deactivated power distribution device 14. The signal derived via the external communication device in this example is not restricted to a host power system monitoring apparatus. In a circumstance where power distribution devices operate in an autonomous and distributed manner, a signal from other power distribution device is permitted.

Figure 32:
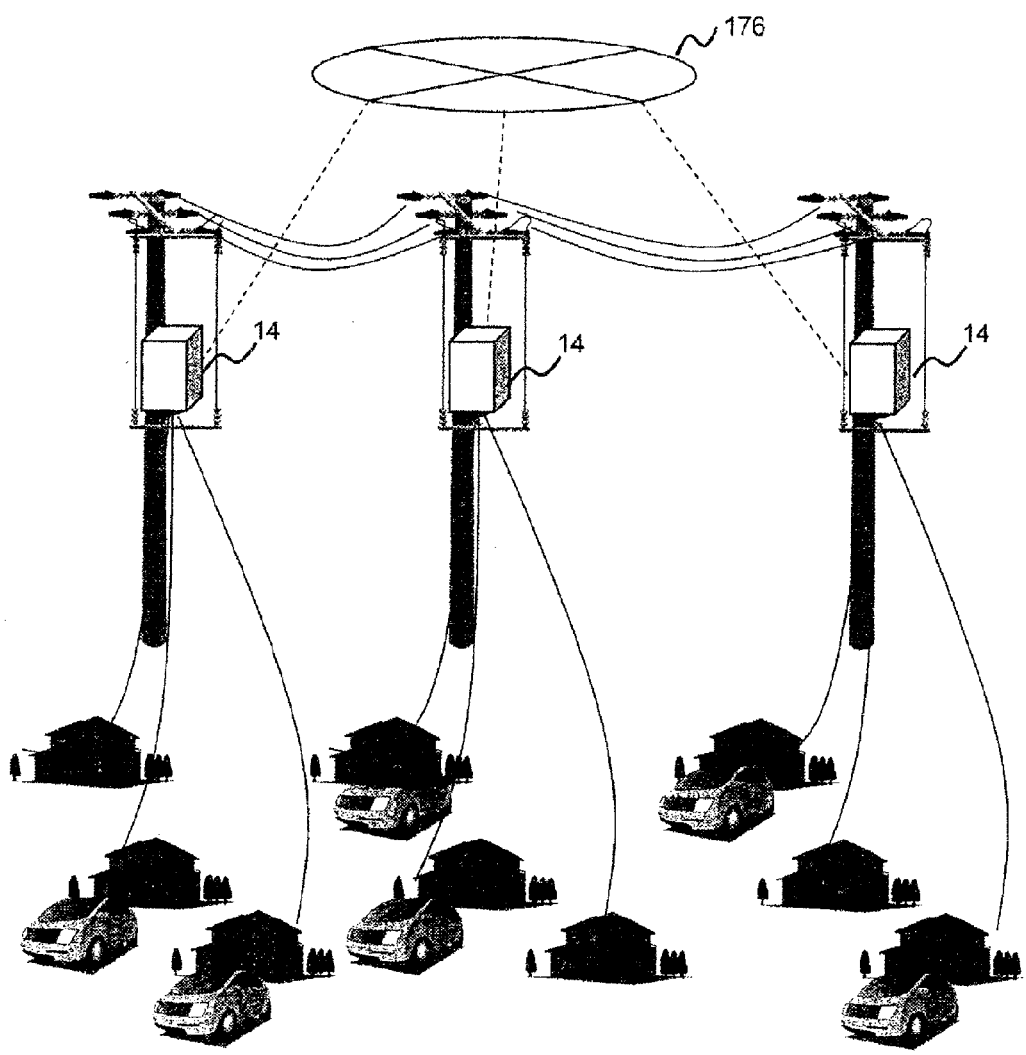
FIG. 32 is one fourth embodiment of power distribution device.

The above-described circumstance is shown in FIG. 32. The switches 131 for all the customers connected with the power distribution device 14 are turned ON simultaneously when the power supply is secured. A check is performed at processing 1373 as to whether none of the switches (SWes) 131 are abnormal. Regarding any faulty switch, the corresponding switch 131 is turned OFF at processing 1375. At processing 1376, processing for excluding the customers having the abnormal switches is performed. If no abnormality is found at processing 1373, a decision is made at processing 1374 as to whether an electricity meter 156 for purchase of electricity and an electricity meter 161 for selling of electricity are connected with each customer. If there is an electricity meter for selling of electricity, it is shown that there is a facility for supplying electric power to the outside. Conversely, if there is no electricity meter for selling of electricity, it can be seen that the customer consists only of a load. Then, at processing 1377, it is attempted to activate the controller 160 of each customer connected by PLC communications for customers having electricity meters for selling of electricity. If the decision at processing 1378 is that the controller operates correctly and is activated, the interconnected ELB 162 and control switch 163 mounted on the storage battery side are electrically energized and their operation is checked at processing 1381. If the decision at processing 1378 is that the operation of the controller is abnormal, the controller of this customer is turned OFF at processing 1379. At processing 1380, processing for excluding the customers having the detected abnormalities from the subject is performed. If the decision at processing 1382 is that the operation of the control switch is normal, information indicating whether the storage batteries connected downstream of the interconnected ELB 162 are connected is obtained at processing 1383. If connected, information about the storage batteries shown in FIG. 7 is obtained. If the decision at processing 1382 is that there is a customer having a control switch whose operation is not normal, processing for excluding the storage battery having a detected abnormality from the subject of control is carried out at processing 1384. After the end of processing 1383, the safety of the insulation of the storage batteries is checked at processing 1385. This is carried out by checking whether the electric power detected by the controller falls within a preset normal range when the control switch 163 is temporarily turned ON. If the decision at processing 1386 is that the checked state of insulation is normal, the controller 160 is controlled at processing 1387. An instruction for tentatively charging from the storage batteries to the power control module 102 is sent to the controller 160 and control switch 163. Then, trial charging is carried out. If the decision at processing 1386 is that the state of the insulation is abnormal, processing for excluding storage batteries having detected troubles from the subject is carried out at processing 1388. Excluding the storage batteries having the detected troubles from the subject at processing 1384 and at processing 1388 is accomplished by turning OFF the associated switch 163 and controller 160. At processing 1389, a check is performed whether there is electrical leakage from the equipment on the customer side by measuring the current or electric power passing through the controller 160 when the trial charging is done at processing 1387. After checking at processing 1390 that there is no electrical leakage and the state is normal, the electric power is controlled using matrix switching. If electrical leakage from the equipment on the customer side is detected at processing 1390, the customer is asked to check the equipment at processing 1392. If the check of the equipment ends at processing 1393, control again returns to processing 1389. The processing is continued. The operation of the safety checking program in the present embodiment has been described so far.

Figure 30:
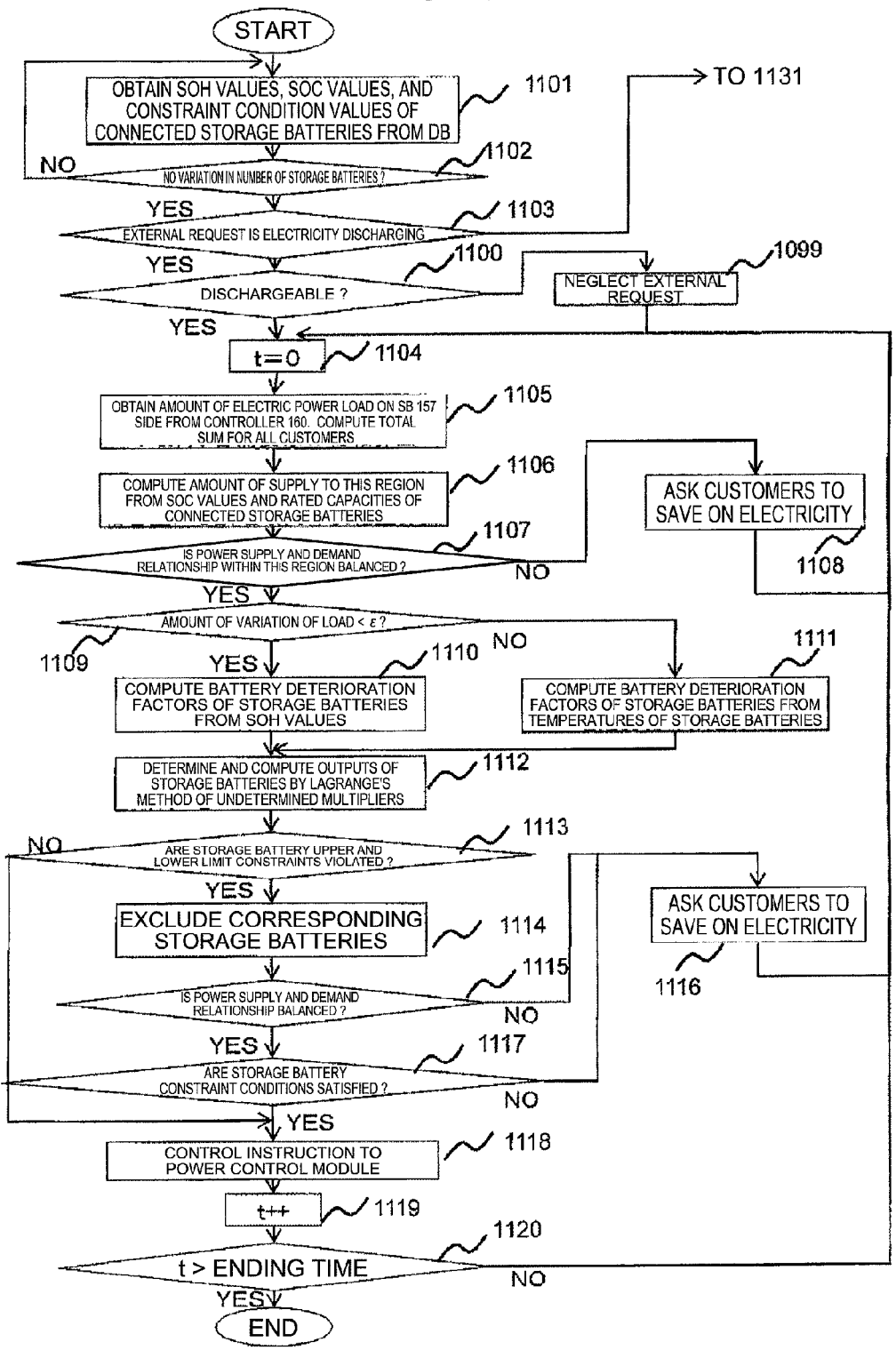
FIG. 30 is one example of processing of a matrix switching program in a secondary storage device.

The operation of the matrix switching program in the present embodiment is described by referring to FIG. 30. First, at processing 1101, parameters and constraint condition values of the storage batteries connected with customers and shown in FIG. 7 are obtained from the database 111. A decision is made at processing 1102 as to whether the number of storage batteries of interest is increased or reduced to cope with a situation where the electric vehicle will return to the customer while transmission of electric power is being conducted by the power distribution device or with a situation where the electric vehicle will leave the customer because there is an urgent business when the power distribution device is carrying out transmission of electric power on the assumption that the electric vehicle is a storage battery. If the decision at processing 1102 is that the number of storage batteries is increased or reduced compared with the previous cycle of time, control returns to processing 1101. The processing is continued. If the decision at processing 1102 is that the number of storage batteries is not increased or reduced, a decision is made at processing 1103 as to whether the request from the host power monitoring control system is electric power discharging under control of the power distribution device. In the case of electric power charging, control goes to processing 1131. In the case of electric power discharging, control proceeds to processing 1100. At processing 1100, an achievable total amount of electricity discharged is calculated from the information about the storage batteries, the information being obtained at processing 1101. A decision is made as to whether the required amount of electricity discharged and the total load of the customers under control of the power distribution device are not greater than the total amount of electricity capable of being released from the storage batteries, based on the results of calculation performed by the load estimating program 114 using the load data obtained during the trial charging by the safety checking program. If the decision at processing 1100 is that electricity can be released, a calculation is performed at processing 1104 in which the required amount of electricity is added as a fixed value to the total load under control of the power distribution device. If the decision at processing 1100 is that electricity cannot be delivered, a notice that it is impossible to comply with a requirement from the outside is given to the host power monitoring control system via a network. Control goes to processing 1104 while neglecting the requirement from the outside. At processing 1104, the time counter is reset. Then, at processing 1105, the amounts of electric power demanded on the side of the contracted power circuit breakers 157 are obtained from the controllers 160 of the customers. At this instant of time, the total demand of the customers under control of the power distribution device is computed. If accurate values cannot be detected from the controllers, the total demand may be calculated using the load estimating program 114. At processing 1106, the amount of supply in this geographic region is calculated from the SOC values and rated capacities of the connected storage batteries. If the decision at processing 1107 is that the total capacity of electricity which can be delivered from the storage batteries and which is obtained at processing 1101 is smaller than the total capacity of the electric power load found at 1105, the customers are asked to save on electricity at processing 1108. Then, control returns to processing 1105. If the decision at processing 1107 is that the supply and demand relationship of electric power is not tight, a decision is made at processing 1109 as to whether the amount of variation of the demand is greater than a preset value $\epsilon$. If smaller than $\epsilon$, the battery deterioration factors of the storage batteries are found from the parameters (obtained at processing 1101) regarding the storage batteries at processing 1110. Then, a calculation for determining the outputs of the batteries by a Lagrange's method of undetermined multipliers as shown in the first embodiment is performed. If the decision at processing 1109 is that the amount of variation of demand is greater than $\epsilon$, it follows that there is a rapid load variation. In calculating the electric powers of the storage batteries under such a condition, it is necessary to take account of the temperatures of the storage batteries. Therefore, at processing 1111, the battery deterioration factors of the storage batteries are computed from the temperatures of the storage batteries. Then, at processing 1112, calculation of the outputs of the storage batteries by a Lagrange's method of undetermined multipliers is determined. If the found outputs of the storage batteries do not violate the upper and lower limit constraints, a control instruction is transmitted to the power control module 102 at processing 1118. An instruction about the calculated outputs of the storage batteries is transmitted to the controllers of the storage batteries. If the decision at processing 1113 is that the upper and lower limit constraints of each storage battery are violated, corresponding storage batteries are excluded at processing 1114. Then, at processing 1115, a decision is made as to whether the power demand and supply requirement is balanced. If the power demand and supply relationship is balanced, the outputs of the storage batteries are recalculated by a Lagrange's method of undetermined multipliers. A decision is made at processing 1117 as to whether the storage battery constraint conditions are satisfied. If the conditions are satisfied, control proceeds to processing 1118. If the decision at processing 1115 is that the power demand and supply relationship is tight, the customers are asked to save on electricity at processing 1116. Processing is again started from processing 1105. If the decision at processing 1117 is that the storage battery constraint conditions are not satisfied, control returns to processing 1116, and similar processing is performed. When one cycle of processing described so far ends, the time counter is incremented at processing 1119. A decision is made at processing 1120 as to whether the initial scheduled control time has elapsed. If the scheduled control time has elapsed, processing is ended. If not so, control returns to processing 1105, and the processing is repeated.

Figure 31:
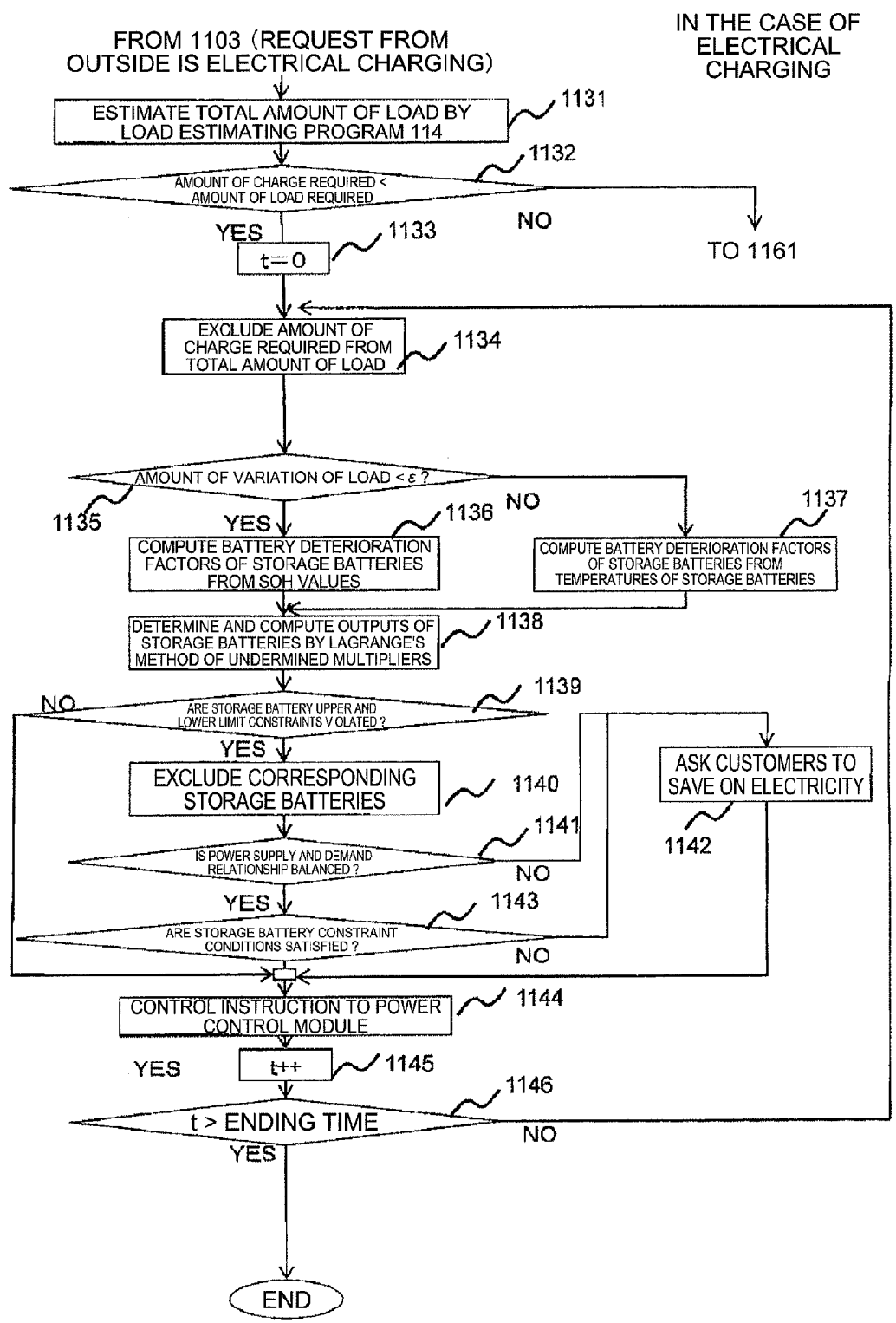
FIG. 31 is one example of processing of a matrix switching program in a secondary storage device.
Figure 33:
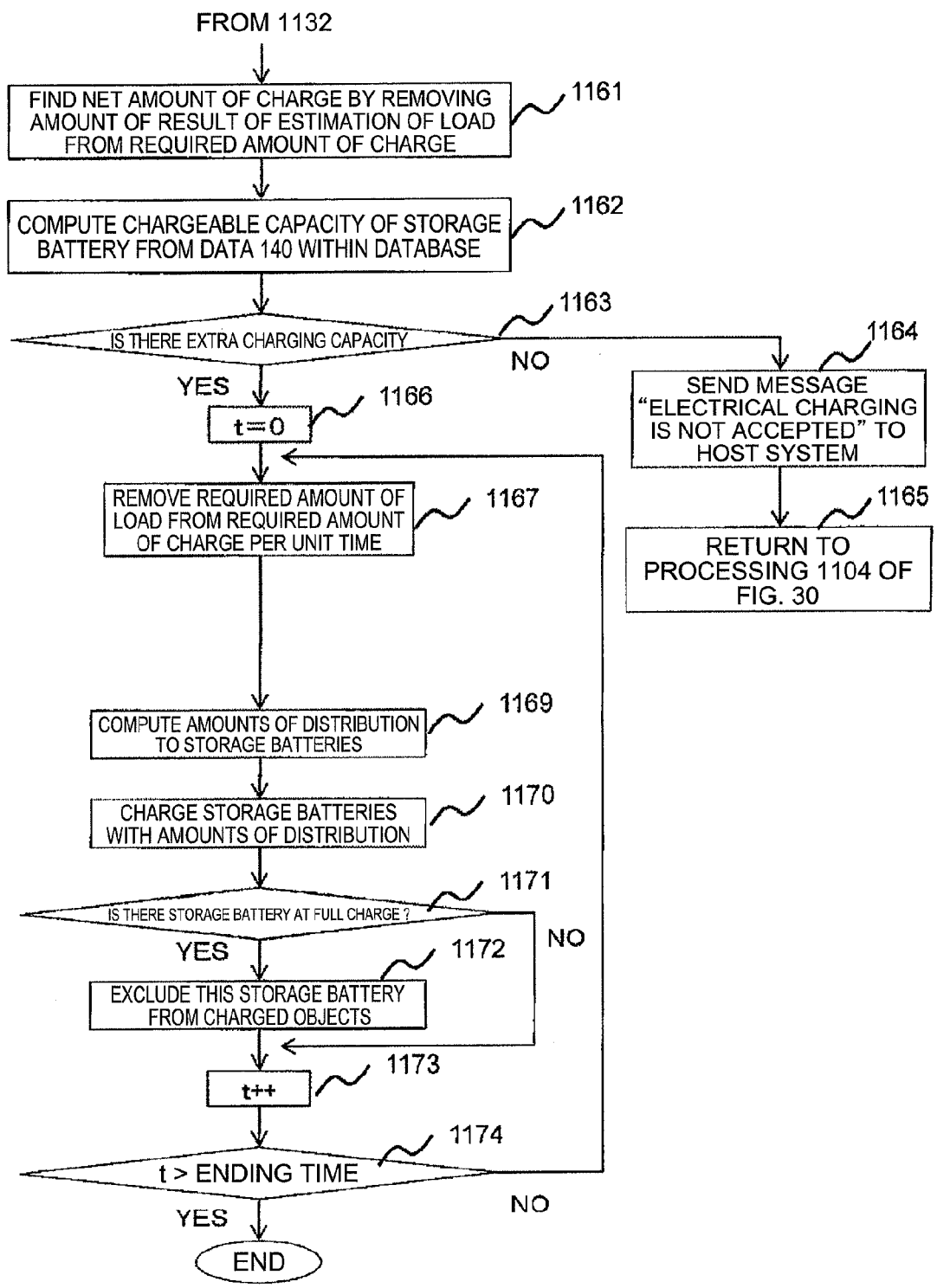
FIG. 33 is one example of processing of a matrix switching program in a secondary storage device.

FIG. 31 shows a flowchart in a case where the decision at processing 1103 in FIG. 30 is that the external request is electric power charging. At processing 1131, using the load estimating program 114, the total amount of load of the customers under control of the power distribution device is estimated. In this estimation method, as described previously, the estimation is made by summing current values or electric power values obtained from sensors when trial charging is done by the safety checking program 107. Then, at processing 1132, a decision is made as to whether the amount of charging required by an external power monitoring controller is smaller than the amount of total load estimated at processing 1131. If the decision is that the amount is smaller, processing steps 1133 to 1146 are performed. These processing steps are similar to the processing steps 1104 to 1120 shown in FIG. 30 except that processing 1134 is added. The processing 1134 is needed to serve the total load of the customers under control of the power distribution device by the amount of electricity required to be charged and the outputs from the storage batteries under control of the power distribution device. If the decision at processing 1132 is that the amount of charging required by the external power monitoring controller is greater than the amount of total load estimated at processing 1131, control goes to processing 1161 in FIG. 33. At processing 1161 of FIG. 33, a net amount of electricity charged is found by removing the estimated amount of load from the amount of charged electricity required by the outside. Then, at processing 1162, an achievable capacity of the storage batteries capable of being charged is calculated from data 140 within the database. Based on the results, at processing 1163, a decision is made as to whether there is an extra charging capacity. If there is no extra charging capacity, a message to the effect that "charging is not allowed" is sent either to an external host system or to other power distribution system at processing 1164. Then, at processing 1165, control returns to processing 1104 of FIG. 30. If the decision at processing 1163 is that there is an extra charging capacity, the time counter is reset at processing 1166. At processing 1167, a calculation for removing the amount of required load from the amount of electricity required to be charged per unit time is performed. Then, at processing 1169, the amounts of distribution to the storage batteries are calculated based on the value found at processing 1167. In determining the amounts of distribution, the amount of distribution per unit time is determined in proportion to the residual amount of each storage battery. Then, at processing 1170, the storage batteries are charged with the amounts of distribution found at processing 1169. At processing 1171, it is detected whether there is any storage battery reaching the upper limit of the amount of charge at this instant of time. If there is any storage battery reaching the upper limit of the amount of storage, processing for excluding this storage battery from the next time cycle of control is performed at 1172. If there is no storage battery to be excluded, the time counter is incremented at processing 1173. If the decision at processing 1174 is that the upper limit of the end time is not exceeded, control returns to processing 1167. The processing is repeated. Otherwise, the processing is ended.

In the fifth embodiment of the present invention, when supply of electric power is totally interrupted between storage batteries which are under control of a power distribution device and which are located, for example, below pole-mounted transformers and a plurality of customers having any one of loading facilities or only loading facilities, a host power monitoring control system issues a charging/discharging instruction to the storage batteries under control of the power distribution device to cooperate with an external power distribution device. A quick decision is made as to whether electrical leakage or eddy currents are produced in the customers. If there are great variations in the loads of the connected customers' devices, deterioration of the storage batteries under control of the power distribution device is suppressed to a minimum by varying control according to the variations. If there are great variations in electric power load, supply of electric power can be secured stably in real time in cooperation with an external electric power system.

Furthermore, the provision of an incentive calculating apparatus within the secondary storage medium in the fifth embodiment of the present invention makes it possible, if great variations in loads of the connected customers' devices are produced, to calculate a discharging pattern of the storage batteries such that the incentive to the owners of the storage batteries is maximized while suppressing deterioration of the performance of the storage batteries to a minimum by varying the control according to the variations and to supply electric power safely and stably according to the priorities of the customers' devices as shown in the second embodiment of the present invention. If electric power from a system is not supplied to the connected customers' devices, safe and stable electric power can be secured without the storage batteries producing electrical leakage or eddy currents while cooperating with an external electric power system.

REFERENCE SIGNS LIST 11-14: power distribution devices; 102: power control module; 103: DC/AC conversion module; 104: starting storage battery; 105: CPU & memory; 106: secondary storage device; 107: safety checking program; 108: matrix switching program; 109: real time priority determining program; 110: incentive calculating program; 111: database; 112: external communication module; 113: outage detecting sensor; 114: load estimating program; 121: switches; 131: switches; 140: storage battery data; 151: storage batteries or electric vehicles; 152: customers; 135: earth leakage breaker; 136: overcurrent detecting sensor; 155: indoor distribution board; 156: electricity meters for purchase of electricity; 157: contracted power circuit breaker; 158: earth leakage breaker; 160: controller; 162: interconnected leakage breaker; 163: control switch; 175: host electric power system monitoring controller; 176: network; 801: power generation plant; 815: power generation plant control center; 816: network

The invention claimed is:

1. A power distribution device comprising:
   a plurality of battery interfaces that are communicatively and electrically coupled to a plurality of storage batteries;
   a plurality of load interfaces that are communicatively and electrically coupled to one or more load devices that consume electric power; and
   a processor communicatively coupled to the plurality of battery interfaces and the plurality of load interfaces;
   wherein the processor:
   acquires deterioration degree information for each of the plurality of storage batteries, wherein the deterioration degree information includes a state of health (SOH) value,
   computes a battery deterioration factor for each of the plurality of storage batteries based on the SOH value of each respective battery,
   calculates an output energy of each of the plurality of storage batteries based on Lagrange's method of undetermined multipliers and the battery deterioration factor,
   selects one or more batteries from the plurality of storage batteries based on the calculated output energy of the one or more batteries; and
   controls the plurality of load interfaces and the plurality of battery interfaces to electrically couple the one or more batteries to the one or more loads.

2. The power distribution device according to claim 1, wherein the processor further:
   acquires consumption amounts for the one or more load devices, and
   wherein the processor selects the one or more batteries from the plurality of storage batteries further based on the consumption amounts for the one or more load devices.

3. The power distribution device according to claim 2, wherein the processor further acquires temperature information about each of the plurality of storage batteries, and
   wherein the processor selects the one or more batteries from the plurality of storage batteries further based on the temperature information.

4. The power distribution device according to claim 3, wherein the processor further selects the one or more batteries from the plurality of storage batteries such that deterioration of a whole one of the plurality of storage batteries is minimized.

5. The power distribution device according to claim 1, wherein the one or more loading devices have respective determined priorities indicating orders of priority in which electric power is supplied to these loading devices, and
   the processor further:
   determines, based on the priorities, which of the plurality of storage batteries is electrically coupled to each of the one or more loading devices.

6. A method of distributing electric power comprising:
   acquiring deterioration degree information from each of a plurality of storage batteries, wherein the deterioration degree information includes a state of health (SOH) value;
   computing a battery deterioration factor for each of the plurality of storage batteries based on the SOH value of each respective battery,
   calculating an output energy of each of the plurality of storage batteries based on Lagrange's method of undetermined multipliers and the battery deterioration factor,
   selecting one or more batteries from the plurality of storage batteries based on the calculated output energy of the one or more batteries; and
   controlling a plurality of load interfaces and the plurality of battery interfaces to electrically couple the one or more batteries to one or more load devices.

7. The method of distributing electric power according to claim 6, further comprising
   acquiring consumption amounts for the one or more load devices, and
   wherein the selecting is further based on the consumption amounts for the one or more load devices.

8. The method of distributing electric power according to claim 7, further comprising:
   acquiring temperature information about each of the plurality of storage batteries, and
   wherein the selecting is further based on the temperature information.

9. The method of distributing electric power according to claim 8, wherein the selecting is performed such that deterioration of a whole one of the plurality of storage batteries is reduced to a minimum.

10. The method of distributing electric power according to claim 6,
    wherein the one or more load devices have respective determined priorities indicating orders of priority in which electric power is supplied to these loading devices, and the method further includes:
determining which of the plurality of storage batteries is electrically coupled to each of the one or more load devices.

11. A power distribution system comprising:
a plurality of power distribution devices, wherein each of the plurality of power distribution devices include:
a plurality of battery interfaces that are communicatively and electrically coupled to a plurality of storage batteries,
a plurality of load interfaces that are communicatively and electrically coupled to one or more load devices that consume electric power, and
an external communication interface;
a controller that is communicatively coupled to each of the plurality of power distribution devices via the external communication interface;
wherein the controller:
acquires deterioration degree information for each of the plurality of storage batteries from each of the plurality of power distribution devices, wherein the deterioration degree information includes a state of health (SOH) value,
computes a battery deterioration factor for each of the plurality of storage batteries from each of the plurality of power distribution devices based on the SOH value of each respective battery,
calculates an output energy of each of the plurality of storage batteries from each of the plurality of power distribution devices based on Lagrange's method of undetermined multipliers and the battery deterioration factor,
selects one or more batteries from the plurality of storage batteries from each of the plurality of power distribution devices based on the calculated output energy of the one or more batteries, and
controls the plurality of load interfaces and the plurality of battery interfaces of the plurality of power distribution devices to electrically couple the one or more batteries to the one or more loads.

* * * * *